United States Patent
Skupin et al.

(10) Patent No.: US 11,838,504 B2
(45) Date of Patent: *Dec. 5, 2023

(54) EFFICIENT SUB-PICTURE EXTRACTION

(71) Applicant: Fraunhofer-Gesellschaft zur Förderung der angewandten Forschung e.V., Munich (DE)

(72) Inventors: Robert Skupin, Berlin (DE); Cornelius Hellge, Berlin (DE); Valeri George, Berlin (DE); Thomas Schierl, Berlin (DE); Yago Sánchez De La Fuente, Berlin (DE); Karsten Sühring, Berlin (DE); Thomas Wiegand, Berlin (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 101 days.

This patent is subject to a terminal disclaimer.

(21) Appl. No.: 17/568,512

(22) Filed: Jan. 4, 2022

(65) Prior Publication Data

US 2022/0272337 A1    Aug. 25, 2022

Related U.S. Application Data

(63) Continuation of application No. 16/930,231, filed on Jul. 15, 2020, now Pat. No. 11,245,898, which is a
(Continued)

(30) Foreign Application Priority Data

Jan. 25, 2018  (EP) .................... 18153516

(51) Int. Cl.
*H04N 19/119* (2014.01)
*H04N 19/174* (2014.01)
(Continued)

(52) U.S. Cl.
CPC ........... *H04N 19/119* (2014.11); *H04L 65/70* (2022.05); *H04L 65/75* (2022.05); *H04N 19/174* (2014.11);
(Continued)

(58) Field of Classification Search
CPC .... H04N 19/119; H04N 19/174; H04N 19/46; H04N 19/70; H04N 19/91; H04N 19/17;
(Continued)

(56) References Cited

U.S. PATENT DOCUMENTS

| 2007/0081668 A1 | 4/2007 | Mcgrew et al. |
| 2014/0003531 A1 | 1/2014 | Coban et al. |

(Continued)

FOREIGN PATENT DOCUMENTS

| CN | 104170383 | 11/2014 |
| CN | 104170383 A | 11/2014 |

(Continued)

OTHER PUBLICATIONS

Chen et al., "A Camera reference Pattern Noise Extraction Algorithm for Image Source Detection", Computer Engineering, vol. 43, No. 12, Dec. 2017.
(Continued)

*Primary Examiner* — Nam D Pham
(74) *Attorney, Agent, or Firm* — NIXON & VANDERHYE P.C.

(57) ABSTRACT

Sub-picture extraction is rendered less complex by providing each slice with start position information which indicates a starting position from which onwards the picture is, along a coding path, encoded into the respective slice, relative to an onset position at which the coding path starts traversing a segment the starting position is located in. Alternatively or additionally, sub-picture extraction processes are treated like choosing one layer out of a multi-layer datastream.

20 Claims, 10 Drawing Sheets

Related U.S. Application Data continuation of application No. PCT/EP2019/051394, filed on Jan. 21, 2019.

(51) Int. Cl.
*H04N 19/46* (2014.01)
*H04N 19/70* (2014.01)
*H04N 19/91* (2014.01)
*H04L 65/70* (2022.01)
*H04L 65/75* (2022.01)

(52) U.S. Cl.
CPC ............. *H04N 19/46* (2014.11); *H04N 19/70* (2014.11); *H04N 19/91* (2014.11)

(58) Field of Classification Search
CPC .... H04N 19/176; H04N 19/48; H04L 65/601; H04L 65/607
See application file for complete search history.

(56) References Cited

U.S. PATENT DOCUMENTS

| | | | |
|---|---|---|---|
| 2014/0086305 A1 | 3/2014 | Esenlik et al. | |
| 2014/0192899 A1* | 7/2014 | Wang | H04N 19/169 375/240.26 |
| 2015/0030068 A1 | 1/2015 | Sato | |

FOREIGN PATENT DOCUMENTS

| | | |
|---|---|---|
| JP | 2007081668 | 3/2007 |
| JP | 2007081668 A | 3/2007 |
| KR | 20150060676 | 3/2015 |
| KR | 20150036169 A | 4/2015 |
| KR | 20150060676 A | 6/2015 |
| KR | 20150036169 | 4/2017 |

OTHER PUBLICATIONS

Tabus et al., "Context Coding of Depth Map Images Under the Piecewise-Constant Image Model Representation", IEEE, Transactions on Image Processing, vol. 22, No. 11, Nov. 2013.

Grüneberg, Karsten, et al., "HEVC tile subsets in 14496-15", 114. MPEG Meeting: Feb. 22, 2016-Feb. 26, 2016; San Diego; {Motion Picture Expert Group or ISO/IEC JTC1/SC29/WG11),No. m37873, Feb. 17, 2016 Feb. 17, 2016), XP030066239.

Misra, Kiran, et al., "An Overview of Tiles in HEVC", IEEE Journal of Selected Topics in Signal Processing. vol. 7, No. 6, Dec. 1, 2013 (Dec. 1, 2013), p. 969-977, XP055257475.

Hen et al., "A Camera reference Pattern Noise Extraction Algorithm for Image Source Detection", Computer Engineering, vol. 43, No. 12, Dec. 2017.

Misra et al., "An Overview of Tiles in HEVC", IEEE Journal of Selected Topics in Signal Processing, vol. 7, No. 6, Dec. 2013.

Tabus et al., "Context Coding of Depth Map Images Under the Piecewise-Constant Image Model Representation", EEE, Transactions on Image Processing, vol. 22, No. 11, Nov. 2013.

Notice of Reason for Rejected dated May 31, 2022, for Japanese patent application 2020-540550 (with translation).

Notice Requesting Submission of Opinion dated Sep. 15, 2021, for Korean Application application 10-2020-7024113 (with translation).

Notice Requesting Submission of Opinion dated Jun. 24, 2022, for Korean Application application 10-2020-7024113 (with translation).

* cited by examiner

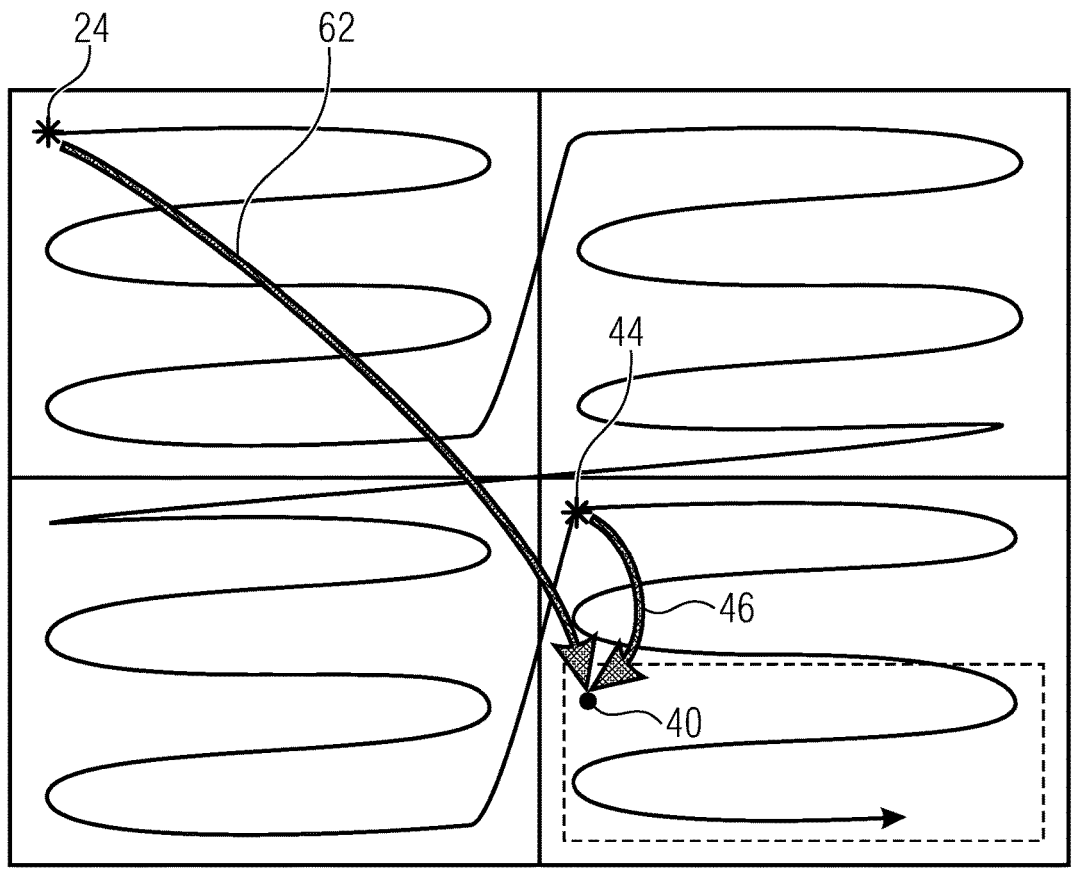
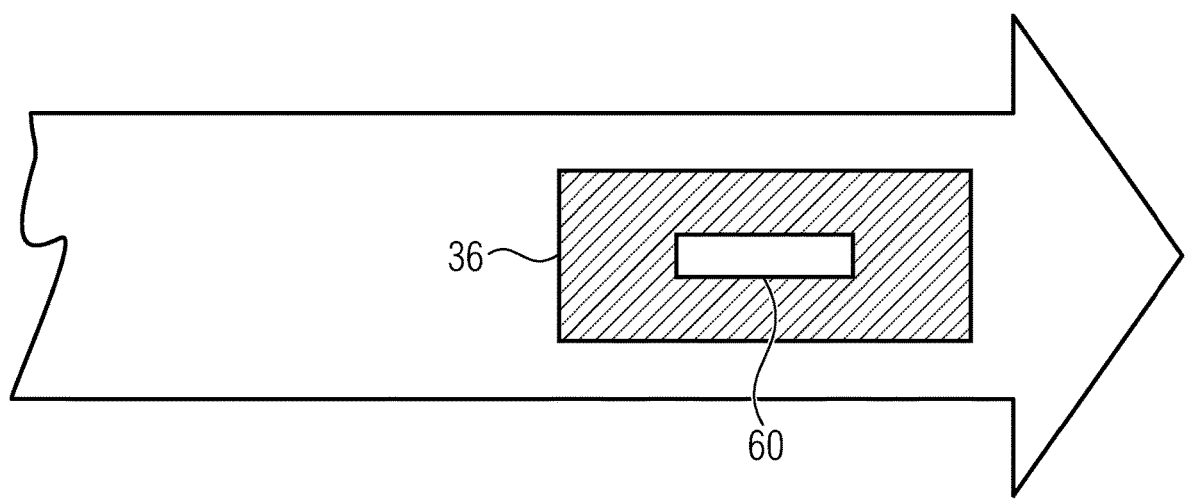
Fig. 2

| pic_parameter_set_rbsp( ) { | Descriptor |
|---|---|
| pps_pic_parameter_set_id | ue(v) |
| pps_seq_parameter_set_id | ue(v) |
| dependent_slice_segments_enabled_flag | u(1) |
| [ ... ] | |
| tiles_enabled_flag | u(1) |
| entropy_coding_sync_enabled_flag | u(1) |
| if( tiles_enabled) { | |
|   num_tile_columns_minus1 | ue(v) |
|   num_tile_rows_minus1 | ue(v) |
|   uniform_spacing_flag | u(1) |
|   if( !uniform_spacing_flag){ | |
|     for( i = 0; i < num_tile_columns_minus1; i++) | |
|       column_width_minus1[ i ] | ue(v) |
|     for( i = 0; i < num_tile_rows_minus1; i++) | |
|       row_height_minus1[ i ] | ue(v) |
|   } | |
|   loop_filter_across_tiles_enabled_flag | u(1) |
|   slice_segment_base_addr_per_tile_enable_flag | u(1) |
|   if ( slice_segment_base_addr_per_tile_enable_flag ){ | |
|     for( i = 0; i < (( num_tile_columns_minus1 + 1 )* ( num_tile_rows_minus1 + 1 ) -1 );i++) | |
|       tile_id_in_pps[ i ] | u(8) |
|   } | |
| } | |
| } | |

| slice_segment_header( ) { | Descriptor |
|---|---|
|   first_slice_segment_in_area_flag | u(1) |
|   if( nal_unit_type >= BLA_W_LP && nal_unit_type <= RSV_IRAP_VCL23) | |
|     no_output_of_prior_pics_flag | u(1) |
|   slice_pic_parameter_set_id | ue(v) |
|   if( slice_segment_base_addr_per_tile_enable_flag ) | |
|     tile_id_in_sh   ⟵(48)124 | u(8) |
|   if( !first_slice_segment_in_pic_flag ) { | |
|     if( dependent_slice_segments_enabled_flag ) | |
|       dependent_slice_segment_flag | u(1) |
|     slice_segment_address | u(v) |
|   } | |
|   if( !dependent_slice_segment_flag ) { | |
|     for( i = 0; i < num_extra_slice_header_bits; i++ ) | |
|       slice_reserved_flag[ i ] | u(1) |
|     slice_type | ue(v) |
|     [ ... ] | |
|   } | |
|   byte_alignment( ) | |
| } | |

| | Descriptor |
|---|---|
| tiling_syntax( ) { | |
|   num_tile_columns_minus1 | ue(v) |
|   num_tile_rows_minus1 | ue(v) |
|   uniform_spacing_flag | u(1) |
|   if ( !uniform_spacing_flag ) { | |
|     for( i = 0; i < num_tile_columns_minus1 ; i++ ) | |
|       column_width_minus1[ i ] | ue(v) |
|     for( i = 0; i < num_tile_rows_minus1; i++ ) | |
|       row_height_minus1[ i ] | ue(v) |
|   } | |
|   loop_filter_across_tiles_enabled_flag | u(1) |
|   slice_segment_base_addr_per_area_enable_flag | u(1) |
|   if( slice_segment_base_addr_per_area_enable_flag ) { | |
|     k=0; NumTilesInArea[ 0..255 ]=0 | |
|     for( i = 0; i < ((num_tile_columns_minus1 + 1) * (num_tile_rows_minus1 + 1) - 1); i++ ) | |
|       area_id_in_ps[i] | u(8) |
|       NumTilesInArea[area_id_in_ps[i]]+=1 | |
|       if(i != 0 && (NumTilesInArea[area_id_in_ps[i]] ==1) ) | |
|         slice_segment_base_address[k++] | ue(v) |
|     } | |
|   num_areas=k+1 | |
| } | |

| seq_parameter_set_rbsp( ) { | Descriptor |
|---|---|
|    sps_video_parameter_set_id | u(4) |
|    sps_max_sub_layers_minus1 | u(3) |
|    [ ... ] | |
|    tiles_enabled_in_sps_flag | u(1) |
|    if( tiles_enabled_in_sps_flag ) { | |
|      tiling_syntax() | |
|    [ ... ] | |
|    rbsp_trailing_bits( ) | |
| } | |

Fig. 8

| pic_parameter_set_rbsp( ) { | Descriptor |
|---|---|
|    pps_pic_parameter_set_id | ue(v) |
|    pps_seq_parameter_set_id | ue(v) |
|    dependent_slice_segments_enabled_flag | u(1) |
|    [ ... ] | |
|    tiles_enabled_in_pps_flag | u(1) |
|    entropy_coding_sync_enabled_flag | u(1) |
|    if( tiles_enabled_in_pps_flag ) { | |
|      tiling_syntax() | |
|    [ ... ] | |
|    rbsp_trailing_bits( ) | |
| } | |

Fig. 9

| | Descriptor |
|---|---|
| slice_segment_header( ) { | |
|   first_slice_segment_in_area_flag | u(1) |
|   if( nal_unit_type >= BLA_W_LP && nal_unit_type <= RSV_IRAP_VCL23) | |
|     no_output_of_prior_pics_flag | u(1) |
|   slice_pic_parameter_set_id | ue(v) |
|   if( slice_segment_base_addr_per_area_enable_flag ) | |
|     area_id_in_sh | u(8) |
|   if( !first_slice_segment_in_pic_flag ) { | |
|     if( dependent_slice_segments_enabled_flag ) | |
|       dependent_slice_segment_flag | u(1) |
|     slice_segment_address | u(v) |
|   } | |
|   if( !dependent_slice_segment_flag ) { | |
|     for( i = 0; i < num_extra_slice_header_bits; i++ ) | |
|       slice_reserved_flag[ i ] | u(1) |
|     slice_type | ue(v) |
|   [ ... ] | |
|   } | |
|   byte_alignment( ) | |
| } | |

Fig. 10

| seg_parameter_set_rbsp( ) { | Descriptor |
|---|---|
| sps_video_parameter_set_id | u(4) |
| sps_max_sub_layers_minus1 | u(3) |
| [ ... ] | |
| tiles_enabled_in_sps_flag | u(1) |
| if( tiles_enabled_in_sps_flag ) { | |
| tiling_syntax() | |
| num_output_tile_formats | ue(v) |
| for( i = 0; i < num_output_tile_formats - 1 ; i++ ){ | |
| pic_width_in_luma_samples[ i ] | ue(v) |
| pic_height_in_luma_samples[ i ] | ue(v) |
| profile_tier_level()[ i ] | |
| } | |
| num_output_tile_sets | ue(v) |
| for( i = 0; i < num_output_tile_sets - 1 ; i++ ){ | |
| num_tiles_in_output_tile_set[ i ] | ue(v) |
| output_tile_set_format_idx[ i ] | ue(v) |
| for(j = 0; j< num_tiles_in_output_tile_set - 1 ; j++ ){ | |
| tile_id_in_sps[ i ][ j ] | ue(v) |
| } | ue(v) |
| hrd_parameters() | |
| } | |
| [ ... ] | |
| rbsp_trailing_bits( ) | |
| } | |

Fig. 11

EFFICIENT SUB-PICTURE EXTRACTION

CROSS-REFERENCES TO RELATED APPLICATIONS

This application is a continuation of U.S. application Ser. No. 16/930,231, filed 5 Jul. 15, 2020, issued as U.S. Pat. No. 11,245,898 on Feb. 8, 2022, which is a continuation of copending International Application No. PCT/EP2019/051394, filed Jan. 21, 2019, which is incorporated herein by reference in its entirety, and additionally claims priority from European Application No. EP 18153516.2, filed Jan. 25, 2018, which is incorporated herein by reference in its entirety.

The present application is concerned with concepts for efficient sub-picture extraction.

BACKGROUND OF THE INVENTION

Sub-picture extraction is a process where a datastream, which has encoded thereinto a video picture, is, without the need for re-encoding, tailored to a sub-picture area. HEVC DAM3 MCTS extraction, for instance, allows for an extraction of a sub-picture-specific datastream from an original full-picture datastream without the need for any re-encoding as far as motion compensation prediction and residual coding, for instance, is concerned, by sub-dividing the pictures constantly into tiles which are coded independently from each other, and grouping the tiles into tile sets with respect to which even the motion-compensated prediction is restricted not to cross tile set boundaries. This MCTS extraction, however, involves adjustment of each NAL unit carrying slice data in order to adjust the slice segment address of the carried slice header.

Accordingly, sub-picture extraction processes are known, but it would be favorable to have concepts at hand which decrease the complexity of the tasks involved.

SUMMARY

An embodiment may have a data stream having a picture encoded thereinto wherein the picture is coded into the data stream along a coding path in units of slices into which the picture is partitioned, wherein the picture is subdivided into segments which are traversed by the coding path sequentially, segment by segment, with each slice having a fraction of a segment, or one or more segments completely, encoded thereinto, wherein the picture has encoded thereinto the segments without coding interdependencies, wherein each slice includes start position information indicating a starting position from which onwards the picture is, along the coding path, encoded into the respective slice, wherein the starting position information indicates the starting position relative to an onset position at which the coding path starts traversing a segment the starting position is located in, and segment information which indicates the segment the starting position is located in.

Another embodiment may have a decoder for decoding a picture from a data stream, wherein the picture is coded into the data stream along a coding path in units of slices into which the picture is partitioned, wherein the picture is subdivided into segments which are traversed by the coding path sequentially, segment by segment, with each slice having a fraction of a segment, or one or more segments completely, encoded thereinto, wherein the picture has encoded thereinto the segments without coding interdependencies, wherein the decoder is configured to, for each slice, decode, from the data stream, a start position information, locate, using the start position information, a starting position from which onwards the picture is encoded into the respective slice, by using the start position information for locating the starting position relative to an onset position at which the coding path starts, along the coding path, traversing a segment the starting position is located in, and decode, from the data stream, segment information which indicates the segment the starting position is located in.

Another embodiment may have a data stream having a picture encoded thereinto wherein the picture is coded into the data stream along a coding path in units of slices into which the picture is partitioned, wherein the picture is subdivided into segments which are traversed by the coding path sequentially, segment by segment, with each slice having a fraction of a segment, or one or more segments completely, encoded thereinto, wherein the picture has encoded thereinto the segments without coding interdependencies, wherein each slice includes a start position information indicating a starting position from which onwards the picture is encoded into the respective slice, wherein the data stream includes a start position coding mode flag which is switchable between a first state and a second state, wherein, if in the first state, the start position information indicates the starting position relative to an onset position at which the coding path starts traversing a segment the starting position is located in, and each slice includes segment information indicating the segment the starting position is located in, and if in the second state, the start position information indicates the starting position relative to a picture onset position at which the coding path starts traversing the picture, with the slices being without the segment information.

Yet another embodiment may have a decoder for decoding a picture from a data stream, wherein the picture is coded into the data stream along a coding path in units of slices into which the picture is partitioned, wherein the picture is subdivided into segments which are traversed by the coding path sequentially, segment by segment, with each slice having a fraction of a segment, or one or more segments completely, encoded thereinto, wherein the picture is encoded into the segments without coding interdependencies, wherein the decoder is configured to, for a predetermined slice decode a start position information indicating a starting position from which onwards the picture is encoded into the predetermined slice, decode a start position coding mode flag which is switchable between a first state and a second state from the data stream, if in the first state, locate, using the start position information, the starting position relative to an onset position at which the coding path starts traversing a segment the starting position is located in, and decode, from the data stream, segment information indicating the segment the starting position is located in, and in the second state, locate, using the start position information, the starting position relative to a picture onset position at which the coding path starts traversing the picture, and determining the segment the starting position is located in on the basis of the starting position.

Yet another embodiment may have a data stream having a picture encoded thereinto wherein the picture is coded into the data stream along a coding path in units of slices into which the picture is partitioned, wherein the picture is subdivided into segments which are traversed by the coding path sequentially, segment by segment, with each slice having a fraction of a segment, or one or more segments completely, encoded thereinto, wherein the picture has encoded thereinto the segments without coding interdependencies, wherein each slice includes segment information which indicates the segment the respective slice covers, wherein the data stream includes a parameter set indicating a size of the picture;

an indication of a first decoder capability level that may be used for decoding the picture from the data stream;

for at least one sub-picture decoding option, a reduced picture size corresponding to a segment cluster composed of a proper subset of the segments, and a second decoder capability level that may be used for decoding the segment cluster from an extracted version of the data stream which results from the data stream by stripping off slices from the data stream having segments encoded thereinto which are spatially offset to the segment cluster.

Another embodiment may have a decoder configured to decode a parameter set from a data stream, derive a decoding option indication whether a picture decoding or sub-picture decoding is to be performed on the data stream, if the picture decoding is to be performed on the data stream, derive from the parameter set a size of a picture and an indication of a first decoder capability level that may be used for decoding the picture from the data stream, and derive from the parameter set a first information on a subdivision of the picture into a first set of segments which are encoded into the data streams without coding interdependencies, decoding the picture from the data stream in units of slices into which the picture is partitioned along a first coding path, wherein the first coding path sequentially, segment by segment, traverses the picture and each slice has a fraction of a segment, or one or more segments completely, out of the first set of segments encoded thereinto, if the sub-picture decoding is to be performed on the data stream, derive from the parameter set a further picture size and an indication of a second decoder capability level that may be used for decoding a sub-picture of the further picture size from the data stream, and derive from the parameter set a second information on a subdivision of the sub-picture into a second set of segments which segments are encoded into the data streams without coding interdependencies and which second set is a subset of the first set of segments, decoding the sub-picture from the data stream in units of the slices into which the sub-picture is partitioned along a second coding path, wherein the second coding path sequentially, segment by segment, traverses the sub-picture and each slice has a fraction of a segment, or one or more segments completely, out of the second set of segments encoded thereinto, wherein the decoder is configured to, for each slice, decode, from the data stream, segment information which indicates a segment out of the first set of segments, in which a starting position is located from which onwards the respective slice is encoded.

Another embodiment may have a method for decoding a picture from a data stream, wherein the picture is coded into the data stream along a coding path in units of slices into which the picture is partitioned, wherein the picture is subdivided into segments which are traversed by the coding path sequentially, segment by segment, with each slice having a fraction of a segment, or one or more segments completely, encoded thereinto, wherein the picture has encoded thereinto the segments without coding interdependencies, wherein the method may have, for each slice, the steps of:

decoding, from the data stream, a start position information, locating, using the start position information, a starting position from which onwards the picture is encoded into the respective slice, by using the start position information for locating the starting position relative to an onset position at which the coding path starts, along the coding path, traversing a segment the starting position is located in, and decoding, from the data stream, segment information which indicates the segment the starting position is located in.

Another embodiment may have a method for decoding a picture from a data stream, wherein the picture is coded into the data stream along a coding path in units of slices into which the picture is partitioned, wherein the picture is subdivided into segments which are traversed by the coding path sequentially, segment by segment, with each slice having a fraction of a segment, or one or more segments completely, encoded thereinto, wherein the picture is encoded into the segments without coding interdependencies, wherein the method may have, for a predetermined slice, the steps of:

decoding a start position information indicating a starting position from which onwards the picture is encoded into the predetermined slice, decoding a start position coding mode flag which is switchable between a first state and a second state from the data stream, if in the first state, locating, using the start position information, the starting position relative to an onset position at which the coding path starts traversing a segment the starting position is located in, and decode, from the data stream, segment information indicating the segment the starting position is located in, and in the second state, locating, using the start position information, the starting position relative to a picture onset position at which the coding path starts traversing the picture, and determining the segment the starting position is located in on the basis of the starting position.

According to another embodiment, a decoding method may have the steps of:

decoding a parameter set from a data stream, deriving a decoding option indication whether a picture decoding or sub-picture decoding is to be performed on the data stream, if the picture decoding is to be performed on the data stream, deriving from the parameter set a size of a picture and an indication of a first decoder capability level that may be used for decoding the picture from the data stream, and deriving from the parameter set a first information on a subdivision of the picture into a first set of segments which are encoded into the data streams without coding interdependencies, decoding the picture from the data stream in units of slices into which the picture is partitioned along a first coding path, wherein the first coding path sequentially, segment by segment, traverses the picture and each slice has a fraction of a segment, or one or more segments completely, out of the first set of segments encoded thereinto, if the sub-picture decoding is to be performed on the data stream, deriving from the parameter set a further picture size and an indication of a second decoder capability level that may be used for decoding a sub-picture of the further picture size from the data stream, and deriving from the parameter set a second information on a subdivision of the sub-picture into a second set of segments which segments are encoded into the data streams without coding interdependencies and which second set is a subset of the first set of segments, decoding the sub-picture from the data stream in units of the slices into which the sub-picture is partitioned along a second coding path, wherein the second coding path sequentially, segment by segment, traverses the sub-picture and each slice has a fraction of a segment, or one or more segments completely, out of the second set of segments encoded thereinto, for each slice, decoding, from the data stream, segment information which indicates a segment out of the first set of segments, in which a starting position is located from which onwards the respective slice is encoded.

Another embodiment may have an encoder for encoding a picture into a data stream, wherein the encoder is configured to encode the picture into the data stream in a manner so that the picture is coded along a coding path in units of slices into which the picture is partitioned, wherein the encoder is configured to encode the picture into the data stream in a manner so that the picture is subdivided into segments which are traversed by the coding path sequentially, segment by segment, with each slice having a fraction of a segment, or one or more segments completely, encoded thereinto, wherein the encoder is configured to encode the segments without coding interdependencies, wherein the encoder is configured to, for each slice, encode, into the data stream, a start position information, so that, using the start position information, a starting position from which onwards the picture is encoded into the respective slice, is locatable by using the start position information for locating the starting position relative to an onset position at which the coding path starts, along the coding path, traversing a segment the starting position is located in, and encode, into the data stream, segment information which indicates the segment the starting position is located in.

Yet another embodiment may have an encoder for encoding a picture into a data stream, wherein the encoder is configured to encode the picture into the data stream in a manner so that the picture is coded along a coding path in units of slices into which the picture is partitioned, wherein the encoder is configured to encode the picture into the data stream in a manner so that the picture is subdivided into segments which are traversed by the coding path sequentially, segment by segment, with each slice having a fraction of a segment, or one or more segments completely, encoded thereinto, wherein the encoder is configured to encode the segments without coding interdependencies, wherein the encoder is configured to, for a predetermined slice encode a start position information indicating a starting position from which onwards the picture is encoded into the predetermined slice, encode a start position coding mode flag which is switchable between a first state and a second state from the data stream, in a manner so that if in the first state, the start position information locates the starting position relative to an onset position at which the coding path starts traversing a segment the starting position is located in, and the encoder is configured to encode, into the data stream, segment information indicating the segment the starting position is located in, and if in the second state, the start position information locates the starting position relative to a picture onset position at which the coding path starts traversing the picture, so that the segment the starting position is located is determinable in on the basis of the starting position.

Another embodiment may have an encoder configured to encode a parameter set into a data stream, wherein the parameter set indicates, for a picture decoding to be performed on the data stream, a size of a picture and an indication of a first decoder capability level that may be used for decoding the picture from the data stream, and a first information on a subdivision of the picture into a first set of segments which are encoded into the data streams without coding interdependencies, wherein according to the picture decoding, the picture is decodable from the data stream in units of slices into which the picture is partitioned along a first coding path, wherein the first coding path sequentially, segment by segment, traverses the picture and each slice has a fraction of a segment, or one or more segments completely, out of the first set of segments encoded thereinto, for a sub-picture decoding to be performed on the data stream, a further picture size and an indication of a second decoder capability level that may be used for decoding a sub-picture of the further picture size from the data stream, and a second information on a subdivision of the sub-picture into a second set of segments which segments are encoded into the data streams without coding interdependencies and which second set is a subset of the first set of segments, wherein according to the sub-picture decoding, the sub-picture is decodable from the data stream in units of the slices into which the sub-picture is partitioned along a second coding path, wherein the second coding path sequentially, segment by segment, traverses the sub-picture and each slice has a fraction of a segment, or one or more segments completely, out of the second set of segments encoded thereinto, encode, for each slice, into the data stream, segment information which indicates a segment out of the first set of segments, in which a starting position is located from which onwards the respective slice is encoded.

Another embodiment may have a method for encoding a picture into a data stream, wherein the method may have the step of encoding the picture into the data stream in a manner so that the picture is coded along a coding path in units of slices into which the picture is partitioned, wherein the picture is encoded into the data stream in a manner so that the picture is subdivided into segments which are traversed by the coding path sequentially, segment by segment, with each slice having a fraction of a segment, or one or more segments completely, encoded thereinto, wherein the segments are encoded without coding interdependencies, wherein the method may have, for each slice, the steps of:

encoding, into the data stream, a start position information, so that, using the start position information, a starting position from which onwards the picture is encoded into the respective slice, is locatable by using the start position information for locating the starting position relative to an onset position at which the coding path starts, along the coding path, traversing a segment the starting position is located in, and encoding, into the data stream, segment information which indicates the segment the starting position is located in.

Yet another embodiment may have a method for encoding a picture into a data stream, which method may have the step of encoding the picture into the data stream in a manner so that the picture is coded along a coding path in units of slices into which the picture is partitioned, wherein the picture is encoded into the data stream in a manner so that the picture is subdivided into segments which are traversed by the coding path sequentially, segment by segment, with each slice having a fraction of a segment, or one or more segments completely, encoded thereinto, wherein the segments are encoded without coding interdependencies, wherein the method may have, for a predetermined slice, the steps of:

encoding a start position information indicating a starting position from which onwards the picture is encoded into the predetermined slice, encoding a start position coding mode flag which is switchable between a first state and a second state from the data stream, in a manner so that if in the first state, the start position information locates the starting position relative to an onset position at which the coding path starts traversing a segment the starting position is located in, and the method may have the step of encoding, into the data stream, segment information indicating the segment the starting position is located in, and if in the second state, the start position information locates the starting position relative to a picture onset position at which the coding path starts traversing the picture, so that the segment the starting position is located is determinable in on the basis of the starting position.

According to another embodiment, an encoding method may have the step of:

encoding a parameter set into a data stream, wherein the parameter set indicates, for a picture decoding to be performed on the data stream, a size of a picture and an indication of a first decoder capability level that may be used for decoding the picture from the data stream, and a first information on a subdivision of the picture into a first set of segments which are encoded into the data streams without coding interdependencies, wherein according to the picture decoding, the picture is decodable from the data stream in units of slices into which the picture is partitioned along a first coding path, wherein the first coding path sequentially, segment by segment, traverses the picture and each slice has a fraction of a segment, or one or more segments completely, out of the first set of segments encoded thereinto, for a sub-picture decoding to be performed on the data stream, a further picture size and an indication of a second decoder capability level that may be used for decoding a sub-picture of the further picture size from the data stream, and a second information on a subdivision of the sub-picture into a second set of segments which segments are encoded into the data streams without coding interdependencies and which second set is a subset of the first set of segments, wherein according to the sub-picture decoding, the sub-picture is decodable from the data stream in units of the slices into which the sub-picture is partitioned along a second coding path, wherein the second coding path sequentially, segment by segment, traverses the sub-picture and each slice has a fraction of a segment, or one or more segments completely, out of the second set of segments encoded thereinto, encoding, for each slice, into the data stream, segment information which indicates a segment out of the first set of segments, in which a starting position is located from which onwards the respective slice is encoded.

According to another embodiment, a non-transitory digital storage medium may have a computer program stored thereon to perform the inventive methods, when said computer program is run by a computer.

In accordance with a first aspect of the present application, sub-picture extraction is rendered less complex by providing each slice with start position information which indicates a starting position from which onwards the picture is, along a coding path, encoded into the respective slice, relative to an onset position at which the coding path starts traversing a segment the starting position is located in. The picture is subdivided into the segments which are traversed by the coding path sequentially, segment by segment, with each slice having a fraction of a segment, or one or more segments completely, encoded thereinto, wherein the picture is encoded into the segments without coding interdependencies. The picture is coded into the datastream along the coding path in units of slices into which the picture is partitioned. Additionally, each slice comprises a segment information which indicates the segment the starting positon is located in. Thus, start position information and segment information together enable to determine within which segment the starting position of a respective slice is located in, and where in this segment. Owing to the segment being encoded without coding interdependencies, it is possible to remove one or more slices concerning one segment without affecting the decodability of another segment. And even if the segments of the picture are used to compile a new sub-picture by shuffling or rearranging the segments and/or discarding some of the segments of the picture, it is possible to form a respective sub-picture-specific datastream on the basis of the original datastream by discarding slices having none of the segments encoded thereinto which form the sub-picture, and adopting slices not having been discarded which still refer to the correct segment and, owing to the relative position indication, indicate the correct position of the starting position of the respective slice within the respective segment. Thus, in accordance with a first aspect of the present application, the datastream enables easy sub-picture extraction without the need for revising the start position information and segment information despite the rearrangement of segments and/or omission of some segments of the picture in the sub-picture datastream. In other words, the sub-picture extraction process is rendered easier by having the opportunity to merely leave-out or discard slices not pertaining to any segment contained in the sub-picture to be extracted, with adopting the remaining slices without having to revise the start position information.

In accordance with an embodiment, the start position information comprises a variable-length-coded start address syntax element. The variable-length coding may be used without any penalties during sub-picture extraction since the start position information needs not to be reversed anyway during sub-picture extraction.

In accordance with even further embodiments, the datastream is, by way of a start position coding mode flag, switchable between the start position information indicating the starting position of a respective slice relative to the segment's onset position, or absolutely relative to a picture onset position at which the coding path starts traversing the picture. In accordance with this option, an existing codec using the absolute start position indication so far, may be extended so as to take advantage of the relative position indication discussed herein. A decoder can be able to understand both types of start position indications offered by way of the start position information, or merely one of them.

In accordance with an even further embodiment, the datastream further comprises a base address data field defining, for each segment, a base address of the onset position of the respective segment which addresses the onset position along the coding path relative to the picture onset position. The conveyance of these base address reuses the computational overhead for computing the base address on the basis of the subdivision of the picture into the segments on its own.

In accordance with an embodiment, the segment information comprises a segment syntax element having a segment index encoded there into, which indexes the segment the starting position is located in. The syntax element can be encoded using a fixed length code. The datastream may comprise an index data field defining an association of a segment index value to each segment. In other words, the index data field may explicitly associate tags, namely segment index values, to the segments and the segment information of a slice is set to the tag or segment index value associated with the segment the starting position of the respective slice is located in. This tagging may easily be modified during sub-picture extraction.

Another aspect of the present application which may be combined with the first aspect is to render easier sub-picture extraction processes by treating sub-picture extraction processes similar to choosing one layer out of a multi-layer datastream. That is, according to the second aspect, an extractable datastream comprises a parameter set indicating, not only, a size of the picture of the datastream and an indication of a first decoder capability level that may be used for decoding the picture from the datastream, but also at least one sub-picture decoding option and, for this at least one sub-picture decoding option, a reduced picture size and a second decoder capability level that may be used for decoding the sub-picture from an extracted version of the datastream. This sub-picture decoding option is treated like a sub-layer relative to a higher layer corresponding to the complete picture: the extracted version of the datastream results from the datastream by stripping off or discarding slices from the datastream having segments encoded there into which are spatially offset to the segment cluster which the sub-picture is composed of. The slices may or may not comprise the start position information and segment information as discussed above with respect to the first aspect. It may suffice, however, if each slice comprises a segment information which indicates the segment the respective slice covers. Thus, in accordance with the second aspect, the process of sub-picture extraction is like transitioning between several layers of a multi-layer datastream and does merely involve an omission of slices not pertaining the intended layer, i.e. here slices not covering any segment included into the sub-picture to be extracted. No "translation" or "modifying" the slices of the datastream to be adopted into the extracted datastream is necessary.

BRIEF DESCRIPTION OF THE DRAWINGS

Embodiments of the present invention will be detailed subsequently referring to the appended drawings, in which:

FIG. 1 shows a schematic diagram illustrating the concept of an extractable datastream using relative start position indication for slices for alleviating the sub-picture extraction process, wherein FIG. 1 illustrates the not-yet extracted datastream as well as the extraction process and extracted datastream as well as the participating entities including encoder, decoder and, optionally, a network device;

FIG. 2 shows a schematic diagram illustrating a picture and a fraction of the datastream in order to illustrate an embodiment according to which the datastream is switchable between relative slice start position indication and absolute slice start position indication;

FIG. 4 shows a pseudocode for illustrating the content conveyed within the parameter set, here exemplarily the picture parameter set, as it could be used in the implementation of FIG. 3;

FIG. 6 shows a pseudocode indicating the possible content conveyed in slice headers in accordance with an implementation example of FIG. 3;

FIG. 7 shows a pseudocode indicating a tiling syntax which could be used for implementing the codec example of FIG. 3;

FIG. 8 shows a pseudocode illustrating a possible content of a parameter set, here exemplarily a sequence parameter set, using the tiling syntax of FIG. 7;

FIG. 9 shows a pseudocode for illustrating a possible content of a parameter set, here exemplarily a picture parameter set using the tiling syntax of FIG. 7;

FIG. 10 shows a pseudocode illustrating a possible content of a content of a slice header for implementing the example of FIG. 3, differing from FIG. 6 in that segments may be compositions of one or more tiles;

FIG. 11 shows a pseudocode illustrating a possible content of a picture parameter set, here exemplarily a sequence parameter set, for illustrating the possibility that the parameter set conveys information for more than the complete picture decoding option, but additionally at least one sub-picture decoding option.

DETAILED DESCRIPTION OF THE INVENTION

Figure 1:
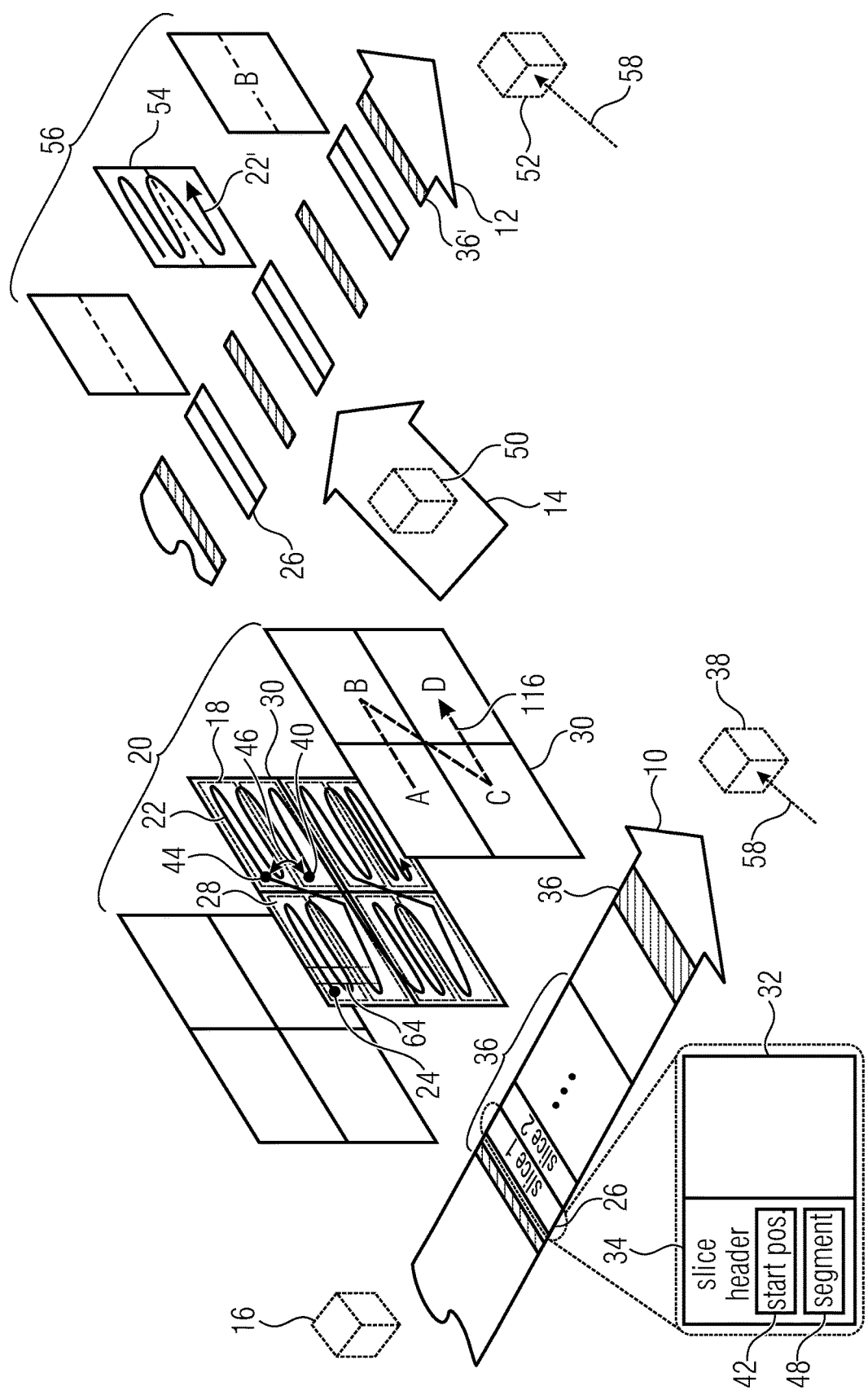

A first embodiment of the present application is described with respect to FIG. 1. FIG. 1 shows a datastream 10 and a sub-picture-specific datastream 12 derived therefrom by sub-picture extraction 14. Datastream 10 can have been generated by an encoder 16. In particular, encoder 16 has encoded into the datastream 10 a picture 18. FIG. 1 illustrates the picture 18 as one picture of a video 20, but it should be noted that embodiments of the present application are not restricted to video datastreams. Rather, the embodiments described herein may easily be transferred onto picture codecs. The following description, however, illustrates embodiments related to video coding.

In encoding picture 18 into datastream 10, encoder 16 obeys or uses a coding path 22 which traverses picture 18 from a picture onset position 24 which, as depicted in FIG. 1, may be located at the top left-hand corner of picture 18, towards, for instance, an opposite picture corner such as the bottom right-hand corner in order to continue with traversing another picture of video 20, for instance. The obeyance or usage of the coding path 22 determines, for instance, the availability of spatially neighboring portions of picture 18, such as samples or parameters derived therefrom by encoder 18 such as syntax elements, for coding a current portion of picture 18. For instance, encoder 16 may use predictive coding. To this end, encoder 16 may predict a current portion such as its sample content or syntax elements describing the same, on the basis of spatially neighboring portions of picture 18 provided that these neighboring portions precede the current portion along coding path 22. Additionally or alternatively, encoder 16 may use other spatial coding dependencies for a current portion such as deriving an entropy context for coding a syntax element describing a current portion of picture 18 on the basis of neighboring portions of picture 18. In addition, encoder 16 uses coding path 22 in order to partition or packetize the data into which picture 18 is coded. To this end, encoder 16 subdivides the coded data into slices along coding path 22. Accordingly, each slice 26 in datastream 10 which contains data of picture 18 covers, or has encoded thereinto, a corresponding portion, i.e. a slice 28 of picture 18 wherein the slices 28 of picture 18 are traversed by coding path 22 sequentially without interleaving slices 28. In other words, coding path 22 traverses each of the slices 28 into which picture 18 is subdivided merely once.

As also depicted in FIG. 1, encoder 16 obeys, in coding picture 18 into datastream 10, also a subdivision of picture 18 into segments 30. FIG. 1 exemplarily illustrates a subdivision of picture 18 into four segments 30 arranged, exemplarily, in a 2×2 array. The number of segments, however, is not critical and may be different. The subdivision of picture 18 in segments 30, however, may be such that segments 30 are arranged in rows and columns. The subdivision of picture 18 into segments 30 may be such that segments 30 completely cover gaplessly picture 18 with segments within one segment row being of the same height, and segments within one segment column being of the same width. However, the thus rectangular segments 30 may vary in size in that the segment columns and/or segment rows may differ in width and height, respectively. The obeyance of the subdivision of picture 18 into segments 30 may relate to the coding interdependencies: encoder 16 encodes picture 18 into datastream 10 in such a manner that coding interdependencies do not cross segment boundaries. To this end, no portion within a segment 30 of picture 18 is coded dependent on a portion of picture 18 external to this segment. In other words, encoder 16 encodes segments 30 independent from each other. As far as the relationship between slices 28 on the one hand and segments 30 on the other hand is concerned, slices 28 either completely cover one or more segments 30 or are merely within one segment 30 only. Merely for illustration purposes, FIG. 1 shows that each segment 30 is composed of two slices 28. This, in turn, means that coding path 22 traverses segments 30 sequentially, i.e. each segment 30 is traversed by coding path 22 completely before coding path 30 traverses a next segment 30 in coding order.

Thus, encoder 16 encodes picture 18 in units of slices 28 into datastream 10. Each slice 26 in datastream 10 has, thus, the corresponding picture slice 28 encoded thereinto. Each slice 26 comprises payload data 32 which encodes the content of the corresponding slice portion 28 of picture 18 in form of, for instance, one or more of prediction parameters such as prediction mode distinguishing, for instance, between intra or inter-coding mode, motion parameters for intra-predicted blocks, intra-prediction sub-modes for intra-predicted blocks, subdivision information for subdividing picture 18 into blocks, and residual data such as transform coefficients which represent the prediction residual.

Before proceeding with the description of the slices' 26 slice headers 34 and its components or syntax elements, respectively, the description of how encoder 16 codes picture 18 into datastream 10 shall briefly be continued. As mentioned previously, segments 30 are segments which are coded independently from each other. So far, however, the description focused on the encoding of picture 18 only. In case of picture 18 being a picture of a video 20, however, it can be that encoder 16 adopts the picture's subdivision into segments 30 for a sequence of pictures of video 20, i.e. subdivides the pictures of the picture sequence in the same manner, i.e. so that the other pictures are segmented into the same number of segments 30 and equally sized segments 30 with the segment borders coinciding spatially among the pictures. This is the situation depicted in FIG. 1, for instance, where a preceding and succeeding picture relative to picture 18 are illustrated as being subdivided in the same manner as picture 18 is, namely into four segments 30. In addition to the mutual independency of coding segments 30 within one picture, encoder 16 may encode each segment of picture 18 in a manner so that the encoding of such a respective segment 30 of picture 18 does not depend on portions of another picture, called reference picture, which are outside or spatially offset to the segment collocated to the respective segment of picture 18. In other words, collocated segments 30 of the pictures within a picture sequence of video 20 may form a spatiotemporal region within video 20 within which encoder 16 performs the encoding independent from the spatiotemporal region formed by another segment of these pictures. Accordingly, the afore-mentioned inter-prediction, i.e. the motion-compensated prediction, would be restricted in a manner so that a block within one of segments 30 of picture 18 which is coded using inter-prediction would not refer, by way of a motion vector, to portions of a reference picture lying outside that segment of the reference picture which is collocated to the segment which the current block is located in. Rather, encoder 16 would, for instance, choose intra-prediction for that block instead.

And even further, it should be noted that, in addition to the slices' 26 slice headers 34 which are described in more detail below, datastream 10 comprises further information containing higher level coding parameters which is called parameter set in the following. This parameter set 36 may be distributed over datastream 10 and may be defined hierarchically in terms of scope. In other words, different portions of parameter set 36 may have a different scope. To this end, some coding parameters may be valid for one picture only such as picture 18, and others may represent coding parameters valid for a sequence of pictures including, for instance, picture 18, and even others may hold true for the whole video 20. Coding parameters defined in parameter set 36 will also be discussed in the following so that a brief discussion may suffice for the time being: coding parameters contained in parameter set 36 may, for instance, indicate the picture size of pictures of video 20, the picture's subdivision into segments 30, an indication of a decoder capability level that may be used for decoding picture 18 and video 20, respectively, from datastream 10 and/or decoding time stamps, coded picture buffer retrieval times and/or buffer sizes to be used for decoding datastream 10.

In addition to the details described so far, it should be noted that encoder 16 may form datastream 10 in a manner so that the slices 26 contained in datastream 10 which pertain one picture such as picture 18 are not interleaved with other slices 26 in datastream 10 pertaining another picture of video 20. Rather, they form a contiguous portion of datastream 10, a so-called access unit 36. An access unit 36, thus, summarizes the slices 26 concerning one picture such as picture 18. Within one access unit 36 other data, in addition to slices 26, may be contained as well such as, for instance, a portion of parameter set 36. The data within one access unit 36 may adhere to some predefined order or prescription for the ordering so that, on the basis of a surveillance of the order of data within datastream 10, the recipient of datastream 10 such as a decoder 38 may recognize the start of a next access unit in datastream 10. Even the slices 26 within one access unit 36 may be ordered mutually according to the order at which coding path 22 traverses the corresponding slices 28 within picture 18.

After having described the general framework for the coding of datastream 10, the description proceeds with a description of the slice header 34 and its content. In particular, encoder 16 provides each slice header 34 with a start position information which indicates a starting position 40 from which onwards the picture 18 is, along the coding path 22, encoded into the respective slice 26 comprising the respective slice header 34. The knowledge about the starting position 40 is to enable decoder 38 to correctly position the picture content encoded into the respective slice 26, namely the picture content pertaining to corresponding slice portion 28 of picture 18 even if any preceding slice concerning picture 18, concerning a slice portion 28 preceding along coding path 22, is missing in datastream 10.

Favorably, however, the start position information 42 indicates the starting position 40 of the slice 26 within the slice header 34 of which the start position information 42 is contained, in a manner relative to an onset position 44 at which the coding path 22 starts traversing the segment 30 the starting position 40 is located in as indicated by an arrow 46 in FIG. 1, exemplarily. The relative indication of the starting position 40 alleviates the sub-picture extraction 14 as explained further below.

In order to compensate for the relative indication of the starting position 40 by the start position information 42, and its associated ambiguity, the slice header 34 additionally comprises segment information 48 which indicates the segment 30 the starting position 40 of the slice 26 is located in to which the segment information 48 belongs. In the example of FIG. 1, for instance, the slice 28, which the starting position 40 is pointed to by arrow 46, is located within the segment 30 indexed by the capital letter "B" in FIG. 1 and accordingly, segment information 48 of that slice would indicate that this slice 26 belongs to segment B. Together, start position information 42 and segment information 48, thus, suffice to determine the absolute position of the starting position 40 within picture 18, i.e. the relative position or starting position 40 with respect to the origin, namely the picture onset position 24.

The decoder 38 which receives datastream 10 is able to decode the start position information 42 of a respective slice 26 from datastream 10 and to locate, using the start position information 42, the starting position 40 of the respective slice relative to the onset position 44 of the segment the starting position 40 is located in. Further, decoder 38 decodes from datastream 10 the corresponding segment information 48 of the respective slice 26 so that the decoder 38 knows about the segment 30 the onset position 44 belongs to relative to which the start position information 42 indicates the starting position 40. The decoder 38 is, thus, able to locate the onset position 44 on the basis of the parameter set 36 which indicates the subdivision of picture 18 into segments 30 and accordingly, combine the relative position indication of the starting position 40, indicated relative to the onset position 44, with the position of the onset position 44 within picture 18 which combination yields the absolute position of starting position 40 within picture 18 relative to the picture onset position 24. In order to alleviate the computational overhead for decoder 38, more detailed embodiments described further below indicate the possibility that the parameter set 36 or some other portion in datastream 10 such as supplemental enhancement information, may indicate the onset position 44 for each segment 30 expressively so that the decoder 38 may use this indication rather than computing the onset position of the segment 30 itself.

It has already been outlined above that the relative indication of the starting position 40, relative to onset position 44 of the corresponding segment 30, is a favorable circumstance. This will now be discussed in more detail. In particular, the favorable circumstance becomes clear when inspecting a sub-picture extraction process 14. The latter process may be performed by any entity processing datastream 10. For instance, the extraction process may be performed by a network device 50 connected into the transmission path between encoder 16 and a decoder 52 receiving the extracted datastream 12. The decoder 52 can be identical to decoder 38, i.e. could be one which would have been able to decode the complete or original datastream 10, too, or could be a decoder which is able to decode the extracted datastream 12, but is unable to decode the complete datastream 10 owing to, for instance, a decoder capability level which is lower than the one of decoder 38. The extraction process 50 could, however, also be performed within the decoder 52/38 itself.

The extraction process 14 aims at forming a datastream 12 which has pictures 54 encoded therein, which, compared to pictures 18, are composed merely of a proper subset of the segments 30 of picture 18 and/or differ in the mutual positioning of segments 30 within the picture area of picture 18 and 54, respectively. FIG. 1 illustrates the case where the pictures 54 of datastream 12 are merely composed of one of the four segments 30 of the picture 18 of the original datastream 10, namely segment B, but this is merely an example and as long as a rectangular picture area of picture 54 results, picture 54 could alternatively be composed of more than one of the segments 30 of picture 18.

Remarkably, with respect to the slices 26 contained in datastream 10, the extraction process 14 merely involves a discarding or omission of slices 26 pertaining segments 30 of picture 18 not contained in picture 54, whereas slices 26 pertaining any segment 30 contributing to the composition of picture 44, is adopted or left-in in the extracted datastream 12 without any modification, especially without any modification of the start position information 42 and the segment information 48. In particular, as the start position information 42 indicates the starting position 40 of slices 26 the starting position falls into a segment 30 contributing to picture 54, is indicated relative to the onset position of the segment, this relative indication is still correct within the reduced datastream 12. Moreover, the segment information 48 indicates for all slices 26 adopted in extracted datastream 12 as to which segment the corresponding slice 26 belongs to, i.e. within which segment its starting position lies. This segment information 48 has also been used in the extraction process 14 in order to identify those slices 26 to be omitted or discarded.

The only information present in the extracted datastream 12 not yet having been discussed with respect to the original datastream 10 are those coding parameters associated with the modified composition of pictures 54 of the extracted datastream 12 on the basis of the selected set of segments 30. Several possibilities exist with respect to this topic. According to a first alternative, the extraction process 14 may involve a modification of the afore-mentioned parameter set 36 so that the corresponding parameter set 36' in the extracted datastream 12 is modified to reflect the modified picture size of pictures 54 of the extracted video 56, the subdivision of picture 54 into segments, the decoder capability level that may be used for decoding the extracted datastream 12 which can be lower than the decoder capability level that may be used for decoding a complete video 20 or pictures 18 from datastream 10, and/or the modified decoding time stamps, coded picture buffer retrieval times and/or buffer sizes for decoding the extracted datastream 12. In accordance with an alternative embodiment, however, the aspect of using the relative start position indication within start position information 42 is combined with an aspect of the present application according to which even the parameter set 36' of the extracted datastream 12 may be left unchanged, namely by providing the parameter set 36 of the original datastream 10 with both information items: in accordance with this alternative, parameter set 36 would indicate all the coding parameters for decoding the whole picture 18 from datastream 10, and concurrently indicate all the coding parameters in order to decode picture 54 from datastream 10 or 12. The coding parameters indicated by parameter set 36 with respect to the extracted datastream 12 and its picture 54 could be, at least partially, indicated in parameter set 36 in a manner relative to, or differentially to, the coding parameters indicated by parameter set 36 for the decoding of picture 18 from datastream 10. For instance, as outlined in more detail below, parameter set 36 could indicate the subdivision of picture 18 into segments 30 so that the sizes of segments 30 are clear from this part of parameter set 36. The coding parameters of parameter set 36 related to picture 54 could rely on this knowledge and could simply indicate as to which segments contribute to picture 54, and as to which mutual arrangement of these contributing segments within picture 54 applies. Even the aforementioned base address indication for the onset positions 44 within picture 18 could be repeated in datastream 36 with respect to the picture 54 of the extracted datastream 12, too. And as further explained below, parameter set 36 could, in this manner, not only indicate one extraction option or sub-picture decoding option for datastream 10, but maybe several ones differing in composition of a picture 54 on the basis of segments 30 of picture 18. Thus, decoder 52 would, in case of the alternative where the parameter set 36' remains unchanged with respect to parameter set 36 in the original datastream 10, receive, for instance, a decoding option indication 58 indicating whether a picture decoding, i.e. a decoding of picture 18, is to be performed on datastream 12, or a sub-picture decoding, i.e. a decoding of picture 54, is to be performed on the datastream 12. In the case, where the non-used slices 26 have already been stripped off as part of a previously performed extraction process 14, this decoding option indication may not indicate the picture decoding as the slices are missing. Remember, however, that the extraction process 14 can be performed by decoder 52 itself which, in turn, can be equal to decoder 38. To this end, decoder 52 can receive the complete original datastream 10 and then, decide on the basis of the decoding option indication 58, to perform the extraction process 14 in terms of stripping-off non-used slices 26 itself, i.e. discarding same. The decoding option indication could, for instance, be an external signalization provided by an application or a user. Alternatively, the decoding option indication could be an inherent indication of the decoder's 52 decoder capability level which, in turn, excludes some of the decoding options of datastream 10 from being decodable by decoder 52 anyway. If the picture decoding with respect to the complete picture 18 is to be performed, the decoding takes place as discussed with respect to decoder 38. If the sub-picture decoding option is to be applied, i.e. decoder 52 is to decode picture 54 from datastream 12, then the decoding process is substantially the same with the following differences: decoder 52 would use the coding parameters of parameter set 36' specific for this sub-picture decoding, i.e. for picture 54. Further, decoder 52 would compute different base addresses for the onset positions 44 of the segments 30 within picture 54 if the computation is to be performed by the decoder 52 itself. The different computational result is a consequence of the difference arrangement of the segments 30 within picture 54. The start position information 42 which indicates the relative position of the slices' starting position 40 is the same as it is indicated relative to the onset positions 44 of the segments by start position information 42. If the onset positions 44 of the segments are indicated in parameter set 36' for the arrangement of segments within picture 54, however, decoder 52 may use these base addresses which are specific for the sub-picture decoding to obtain picture 54, instead of an own computation.

More details on how decoder 38/52 can operate in decoding an inbound data stream—can it be 10 or 12—are set out at the end of description with respect to FIG. 11.

In the following description, a concrete example for implementing the above-outlined embodiment is described. In doing so, it is assumed that the datastream comprises within parameter set 36 a start position coding mode flag 60 which switches between the relative start position indication 46 of the slices' starting positions 40 relative to segment onset positions 44 as described with respect to FIG. 1, on the one hand, and an absolute start position indication 62 of the slices' starting positions 40 relative to the picture onset position 24. In other words, flag 60 signals whether the start position indications 42 in the slices 26 of datastream 10 indicate the starting positions 40 in the manner outlined with respect to FIG. 1, i.e. in relative terms with respect to the segments' onset positions 44, or absolutely with respect to the picture onset position 24. Flag 16 may, as further discussed below, then also be used in order to switch-on the presence of segment indication 48. Merely in case of the relative start position indication 46, the segment indication 48 can be present in the slices 26.

A further detail which will become clear from the subsequently explained embodiments is the fact that the slice position indication 42 can in fact be signaled by way of a combination of a flag and a conditionally signaled slice address: in case of the relative indication option 46, a flag contained by the start position information 42 would indicate whether the corresponding slice is the first in a segment, i.e. its starting position 40 coincides with the onset position 44 of the corresponding segment. If this is the case, the start position information 42 does not contain any start address syntax element. If not, however, the address syntax element points from the onset position 44 of the corresponding segment, to the starting position 40 of the slice. In case of the absolute indication option 62, the flag of the start position information 42 indicates whether or not the corresponding slice starts at the picture onset position 24, i.e. is the first slice of the picture, and if yes, the slice position information does not contain any address syntax element. If not, however, the address syntax element indicates the starting position 40 of the respective slice relative to the picture onset position 24. The just-mentioned flag comprised by start position information 42 can be used by decoders 38/52 for access unit border detection, i.e. detection of a new access unit 36, in case of absolute indication mode. To compensate for the inability to use this detectability in the relative indication mode, encoder 16 may use alternative access unit borer mechanisms such as the placement of access unit delimiters, i.e. certain packets, at borders between consecutive access units. The decoder may then use these delimiters in case of relative indication mode.

And as a further note before starting with the subsequent more detailed explanation of embodiments, it is noted that different possibilities exist for indicating the starting position 40 by way of the start position information 42. For instance, picture 18 can be subdivided regularly into an array of blocks as illustrated at the top left-hand corner of picture 18 in FIG. 1. Coding path 22 may traverse these coding blocks 64 sequentially without interleaving, i.e. one coding block 64 is traversed completely before proceeding to the next coding block 64 of picture 18. The starting position information 42 may indicate position 42 measured in units of traversed coding blocks 64 up to the starting position 40 along coding path 22. If indicated relatively 46, start position information 42 would indicate the number of coding blocks 64 separating, along coding path 22, onset position 44 and slice starting position 40. In case of the absolute indication option 62, start position information 42 indicates the starting position 40 in units of traversed coding blocks 64 along coding path 22, when starting from the picture onset position 24. Accordingly, in this case the start position indication 42 would use a linear, one dimensional addressing domain and the base address of the onset position 44 of the segments mentioned above, could also be measured in number of coding blocks 64 traversed when starting from picture onset position 24 to the respective segment onset position 44. The summation of a base address 44 and the slice starting position 40 would yield the absolute address measured from the starting position 24 onwards. Alternative ways of signaling the starting position 40 by way of the start position information 42 would be feasible, however, too. For instance, the relative position of a starting position 40 relative to the corresponding segment onset position 44 could be indicated as x and y coordinates of a vector pointing from onset position 44 to the slice start position 40, with the components x and y measured in samples or units of coding blocks 64, respectively. Further, the addressing could be performed following a strictly row-wise linear addressing of the afore-mentioned coding blocks 64, i.e. in a manner where the addresses of the coding blocks within one complete row of picture 18 follow each other before the addresses increase with a first coding block of the next row within a picture, irrespective of the segmentation into segments 30. Internally, decoders 38 and 52 may switch between different address systems or domains as needed.

Another possibility which will become clear from the following description is the following: segments 30 have been described so far as being possible spatial cross-sections of spatiotemporal regions where the coding interdependencies do not cross the borders of these spatiotemporal regions. These segments 30 may, for instance, be defined to be sets of one or more tiles into which pictures 18 may be subdivided and which are coded independent from each other as far as the coding of one picture 18 is concerned. Thus, segments 30 may be tiles in case of one segment 30 being composed of one tile and in the subsequently explained variant A this is the case, whereas variant B assumes that segments 30 may be composed of one or more tiles. Moreover, according to the subsequent explanation, the afore-mentioned coding blocks 64 are CTUs (coding tree units) meaning that these blocks 64 are tree-root blocks further subdivided hierarchically by multi-tree subdivisioning into coding blocks, prediction blocks and/or transform blocks in units of which encoder 16 selects the coding modes to be used, namely inter or intra-coding of corresponding coding blocks, in units of which the prediction parameters of the corresponding selected coding mode is set, namely for each prediction block which can be a leave node of a coding block, and in units of which the transform of the prediction residual takes place, namely in units of transform blocks which can be also leave blocks of coding blocks. The subdivision of CTUs 64 into coding units, prediction blocks and transform blocks can be signaled as part of the corresponding slice payload 32.

Thus, in the following, an implementation of the embodiment described with respect to FIG. 1 is illustrated as a possible modification of the HEVC framework. As described in the introductory portion of the specification of the present application, in HEVC DAM3 MCTS extraction, adjustment to the slice segment address of each slice header is useful, which in turn may impact even the byte alignment of each slice header owing to the variable length coding of the slice addresses. In particular, if using HEVC DAM3 MCTS, the slice addresses of slices adopted in an MCTS extracted datastream would have to be amended owing to their absolute indication option, i.e. they would have to be modified to refer to the new picture onset position of picture 54, and this could, owing to the variable length coding, lead to a different length of the slice address and, accordingly, to a different byte alignment. The subsequently explained modification of the HEVC framework would overcome this.

In particular, a comparatively simpler MCTS sub-stream extraction results by signaling a part of the slice segment address to implicit or explicit association of slices with tiles/segments.

In the following, a first variant, variant A, of a modification of HEVC framework is described. As outlined above with respect to FIG. 1, according to this variant, the slice segment addresses are signaled relative to the first CTU of the respective tile or composition of tiles, i.e. the current segment 30, as opposed to signal slice segment addresses relative to the first CTU of the picture. "First" means, when using the HEVC coding order, the left-most and top-most CTU.

The difference between the two references, i.e. first CTU of the current segment 30, or first CTU of the picture, can be derived by the decoder, i.e. decoder 38 or 52, by combining the picture and tile instruction information from parameter sets 36 and 36', respectively, the association of slices 28/26 to this segment 30 which may be tiles or sets of tiles wherein the association may be transmitted in the datastream explicitly as outlined below.

Arrays with information about the segment sizes in CTBs and slice address offsets per segment 30 may be determined on decoder side. The access unit 36 start detection to be performed by a decoder 38 or 52, respectively, which may be performed on the basis of the flag contained in the start position information 42 in case of the absolute indication option 62 as this flag indicates the first slice of the access unit 36 and picture 18, respectively, may be done in case of the relative indication option 46 by use of an access unit delimiter NAL unit in the datastream 10, i.e. special packets which separate consecutive access units in datastream 10 are used to signal junctions between consecutive access units. As described above, the first_slice_in_pic_flag may be comprised by the start position information 42 and may be turned into a flag that indicates the start of a segment 30 which, in turn, may be a tile or a composition of tiles.

Figure 3:
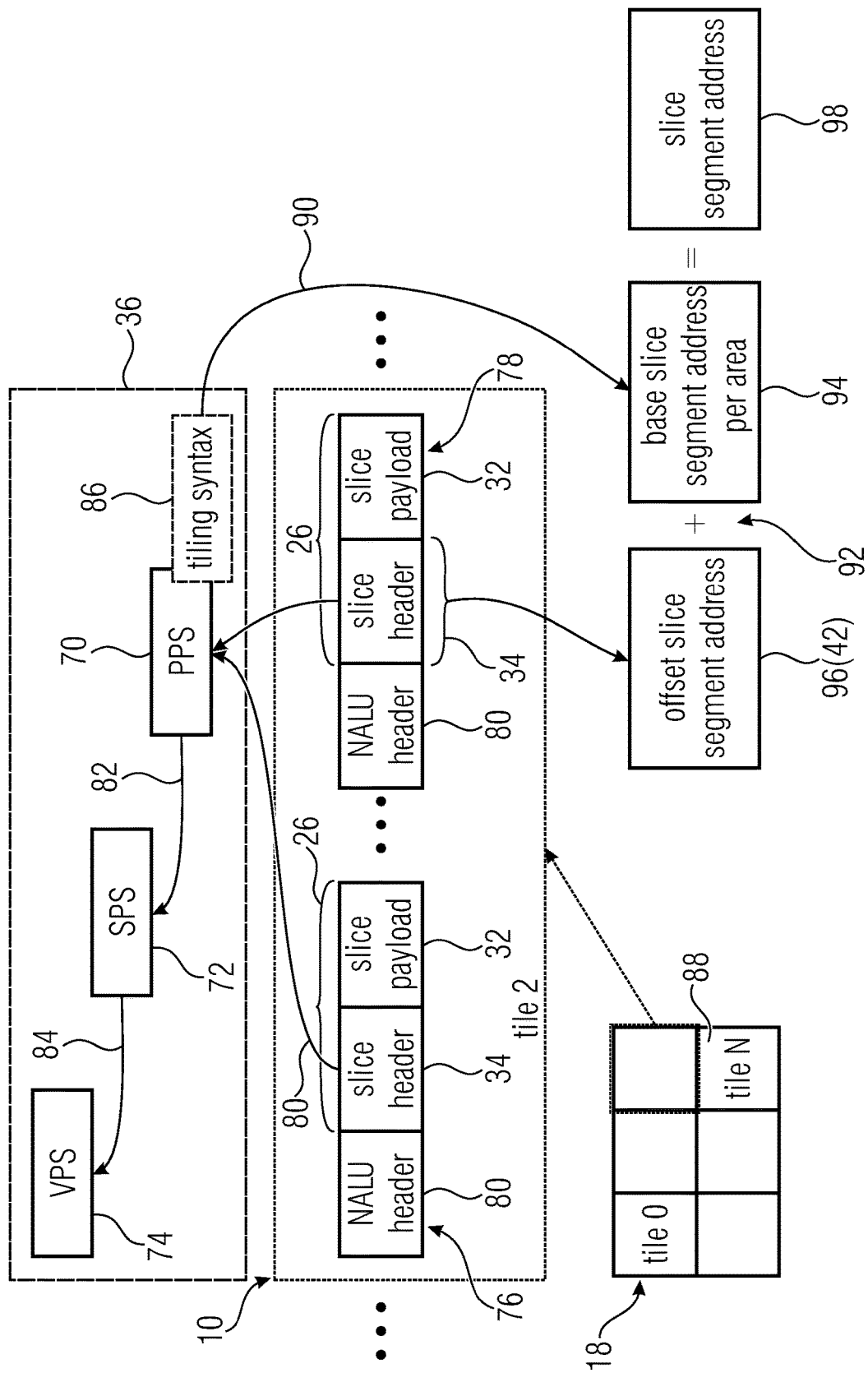
FIG. 3 shows a schematic diagram illustrating an implementation of a datastream as presented with respect to FIG. 1 as a variant of an HEVC datastream.
Figure 5:
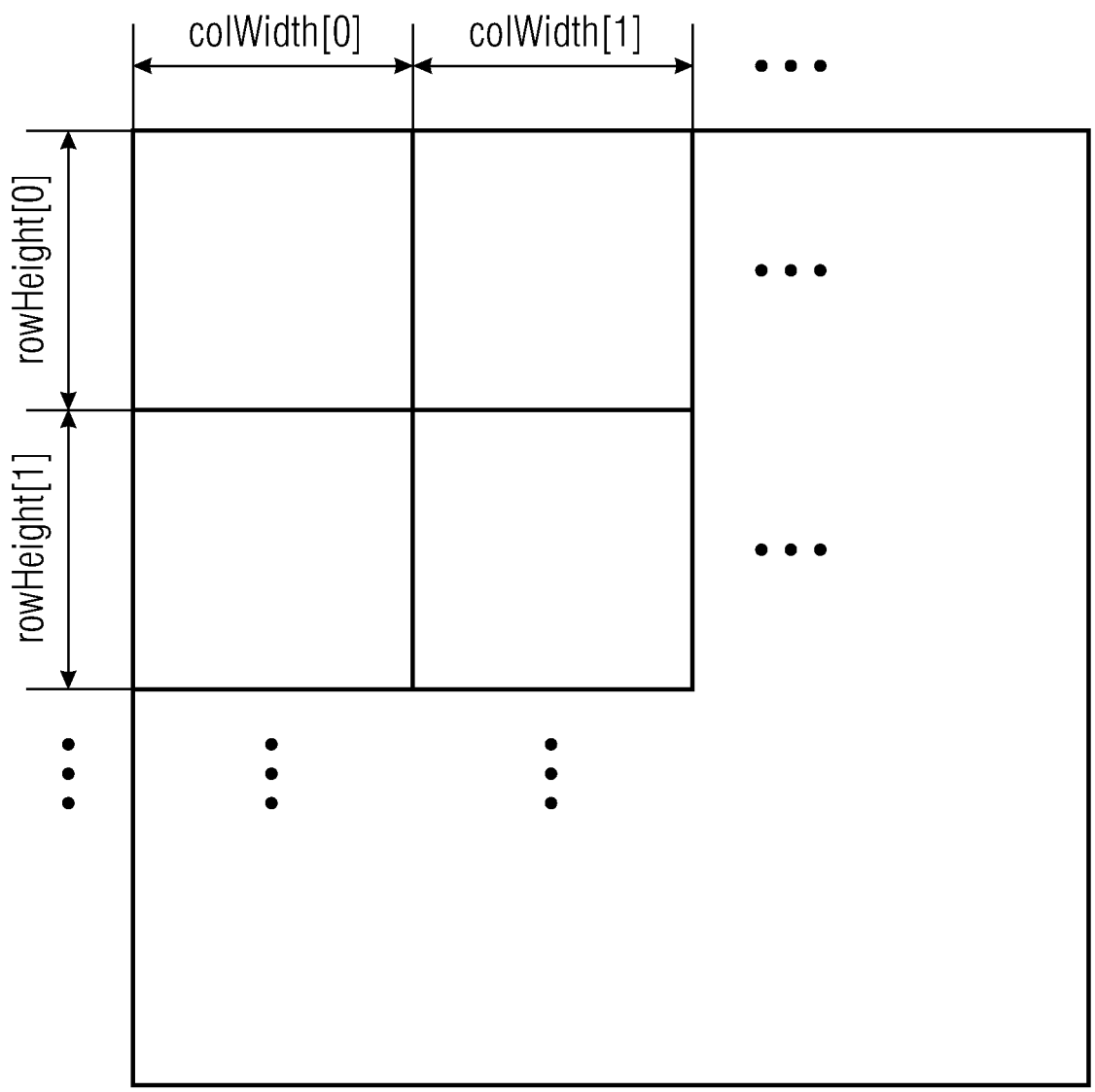
FIG. 5 shows a schematic diagram of a picture and its segmentation into segments along with parameters used in pseudocodes presented with respect to the implementation examples provided with respect to FIG. 3.

FIG. 3 provides an over view of the resulting embodiment using the HEVC nomenclature. As indicated, the parameter set 36 is distributed over picture parameter sets 70, sequence parameter sets 72 and video parameter sets 74 differing in scope. FIG. 3 merely shows a fraction out of datastream 10, namely two VCL NAL units 76 and 78, each comprising an NALU header 80 indicating that same comprises slice information, followed by the corresponding slice 26 composed of slice header 34 and slice payload 32. The slice headers 34 refer to the corresponding picture parameter set 70 as indicated by arrows 80 and the picture parameter sets 70, in turn, point to the corresponding sequence parameter set as indicated by 82, and the sequence parameter sets 72, in turn, point to the corresponding valid video parameter set as indicated by 84. The parameter set 36 suggests, for instance, the picture parameter set 70 or the sequence parameter set 72, contains tiling syntax 86, i.e. syntax defining the subdivision of picture 14 into tiles 88 which, according to one alternative, form the segments 30 discussed above in FIG. 1. Thus, on the basis of the tiling syntax 86, it is possible for the decoder, for instance, to compute the base slice segment addresses as indicated by arrow 90. A summation 92 of the base slice segment addresses 94 and the offset slice segment addresses 96 conveyed as part of the start position information 42 and the slice headers 34 yields the corresponding slice segment address 98 of the corresponding slice 26, i.e. the slice segment address measured absolutely against the picture onset position 24. FIG. 3 shows the two slices 26 depicted in FIG. 3 as belonging to one tile of the tiles 88, namely tile number 2 which in fact is derivable for the decoder on the basis of this segment information 48 also comprised by the slice headers 34 as will become clear from the following description.

In particular, according to the embodiment shown in FIG. 4, the tiling structure or tiling syntax 86 may be comprised in the picture parameter set 70. It is noted, that an alternative embodiment would be feasible as well according to which the tiling syntax 86 would be present in the sequence parameter set 72, for instance, rather than the picture parameter set.

In particular, as depicted in FIG. 4, a portion 100 of parameter set 70 indicates the subdivision of picture 18 into segments 30, here tiles. The number of segment columns is indicated at 102, the number of segment rows is indicated at 104 and a flag 106 optionally offers the opportunity to signal in the datastream that the segment columns' width and segment rows' height is set uniformly. If not present, or if flag 106 is not set, the widths of the segment columns are indicated at 108 individually and the heights of the segment rows are indicated individually at 110.

Further, an explicit tagging of the segments is provided if a flag slice_segment_base_addr_per_tile_enable_flag 112 is set, namely by way of signaling, explicitly, at 114, a segment index value tile_id_in_pps[i] per segment i 30 of picture 18. The segment indices are conveyed in the datastream, i.e. in parameter set 70, by using a default order among the regular array of segments 30 such as row-wise as illustrated by a dashed arrow in FIG. 1, 116.

The semantics of the syntax element in FIG. 4 are outlined in detail below:

slice_segment_base_addr_per_tile_enable_flag equal to 0 specifies that the variable CtbAddrInRs of a slice segment is derived solely from slice_segment_address. slice_segment_base_addr_per_tile_enable_flag equal to 1 specifies that deriviation of CtbAddrInRs is based on slice_segment_address and a tile dependent base address. When slice_segment_base_addr_per_tile_enable_flag is not present, it is inferred to be equal to 0.

tile_id_in_pps[i] specifies the id of tiles in bitstream order. The value of tile_id_in_pps[i] shall be in the range of 0 to 255 and tile_id_in_pps[i] shall not have the same value as tile_id_in_pps[j] for i unequal to j. When tile_id_in_pps is not present, it is inferred to be equal to 0

It can be a constraint of bitstream conformance that when slice_segment_base_addr_per_tile_enable_flag is equal to 1, access unit delimiter NAL units are present in the bitstream and that tiles_fixed_structure_flag is equal to 1.

The following pseudo codes indicate as to how a decoder like decoder 38 or 52, may compute certain dimensions of segments 30 and the base addresses of segments 30, for instance, on the basis of the available information in the datastream.

The following describes a coding tree block raster and tile scanning conversion process.

The list colWidth[i] for i ranging from 0 to num_tile_columns_minus1, inclusive, specifying the width of the i-th tile column in units of coding tree blocks (CTBs), is derived as follows (pseudo code 1):

```
if( uniform_spacing_flag )
    for( i = 0; i <= num_tile_columns_minus1; i++ )
        colWidth[ i ] = ( ( i + 1 ) * PicWidthInCtbsY ) /
            ( num_tile_columns_minus1 + 1) - ( i * PicWidthInCtbsY ) /
            ( num_tile_columns_minus1 + 1 )
else {
    colWidth[ num_tile_columns_minus1 ] = PicWidthInCtbsY
```

```
for( i = 0; i < num_tile_columns_minus1; i++ ) {
    colWidth[ i ] = column_width_minus1[ i ] + 1
    colWidth[ num_tile_columns_minus1 ] -= colWidth[ i ]
  }
}
``` colWidth[i] is the width of the $i^{th}$ segment column among column 0 . . . num_tile_columns_minus1 measured in coding tree blocks CTBs 64 num_tile_columns_minus1 is the number segment columns minus 1

The list rowHeight[j] for j ranging from 0 to num_tile_rows_minus1, inclusive, specifying the height of the j-th tile row in units of CTBs, is derived as follows (pseudo code 2):

```
if( uniform_spacing_flag )
  for( j = 0; j <= num_tile_rows_minus1; j++ )
    rowHeight[ j ] = ( ( j + 1 ) * PicHeightInCtbsY ) / ( num_tile_rows_minus1 + 1 ) -
                     ( j * PicHeightInCtbsY ) / ( num_tile_rows_minus1 + 1)
else {
  rowHeight[num_tile_rows_minus1 ] = PicHeightInCtbsY
  for( j = 0; j < num_tile_rows_minus1; j++ ) {
    rowHeight[ j ] = row_height_minus1[ j ] + 1
    rowHeight[ num_tile_rows_minus1 ] -= rowHeight[ j ]
  }
}
``` rowHeight[i] is the height of the $i^{th}$ segment row among rows 0 . . . num_tile_rows_minus1 measured in coding tree blocks CTBs 64
num_tile_rows_minus1 is the number segment rows minus 1

The list TileId[ctbAddrTs] for ctbAddrTs ranging from 0 to PicSizeInCtbsY-1, inclusive, specifying the conversion from a CTB address in tile scan to a tile ID, is derived as follows (pseudo code 3):

```
for( j = 0, tileIdx = 0; j <= num_tile_rows_minus1; j++ )
  for( i = 0; i <= num_tile_columns_minus1; i++, tileIdx++ )
    tileIdxTileIdMap[ tile_id_in_pps[ tileIdx ] ] = tileIdx
    for( y = rowBd[ j ]; y < rowBd[ j + 1 ]; y++ )
      for( x = colBd[ i ]; x < colBd[ i + 1 ]; x++ )
        TileId[ CtbAddrRsToTs[ y * PicWidthInCtbsY+ x ] ] = tileIdx
``` tileIdxTileIdMap[ ] is construed to map the N segment index values contained in vector tile_id_in_pps[ ] to the tileIdx of that segment
tile_id_in_pps[ ] is a vector containing entries 0 . . . N-1 with N being the number of segments 30, with the $i^{th}$ entry indicating the segment index values associated with the $i^{th}$ segment in raster scan segment order 116
tileIdx indexes the segments 30 in raster scan segment order 116
TileId[i] is construed to map a CTB address i, i.e. an address of a block 64, measured in coding order, or along coding path 22, to the tileIdx of the segment 39 this CTB is located in
CtbAddrRsToTs[i] is a function which maps a rank i of a block 64 which is the $i^{th}$ block 64 of picture 18 in a picture raster scan order leading row-wise through the blocks 64 of picture 18, to its address measured in coding order 22
colBd[i] is a vector containing entries 0 . . . N with N being the number segment columns minus 1, with the $i^{th}$ entry, with i<N indicating the position of the left-hand side of the $i^{th}$, from left to right, segment column measured in block 64, and $N^{th}$ entry indicating the picture width in number of blocks Please note that all the parameters used in the pseudo codes so far, although they have been described as being used for determining the base addresses in case of full picture decoding, i.e with respect to picture 18, may be used for determining the base addresses for the segments' onset positions in sub-picture 54 as well. Here, the parameters N, colWidth[i], num_tile_columns_minus1, rowHeight[i], num_tile_rows_minus1, tileIdxTileIdMap[ ], tile_id_in_pps[ ], CtbAddrRsToTs[i], colBd[i] are specific for this sub-picture 54 and its composition by segments 30 and its subdivision into corresponding blocks 64, respectively. Similarly, all references to the coding path 22 and raster scan segment order 116 are applied onto the respective sub-picture. tileIdxTileIdMap[ ] guarantees the maintenance of the association between the segment index values tile_id_in_sh, which assume any of tile_id_in_pps[ ], one the one hand and the segments of the sub-picture 54 and their indexing in raster scan segment order 116, i.e. tileIdx, on the other hand. As a minor note, it should be noted that the syntax element suffix "_pps" has been chosen here in order to reflect the example of carrying the segment index value to segment association in the PPS, but as already outlined above, this is merely an example and the signalization could also be realized elsewhere such as in SPS or VPS. In line with the latter statement, alternatively, the suffix "_ps" has been used and a corresponding replacement is naturally also applicable to the present embodiment. Similarly, the following examples will reveal that the 1:1 correspondence between tiles and segments may given up. This had also been outlined already with respect to FIG. 1. Accordingly, corresponding subsequent embodiments use name components "Area" or "area_" or "_area" instead which will become clear from the following description. Further, as also mentioned in the description of FIG. 1, an explicit assignment of tags or segment index values to the segments could be left of in alternative embodiments, with deriving the mapping between segment index values in segment information 48 and the segments in the sub-picture 54 implicitly such as by using, for instance, the index domain tileIdx, instead, in which case the transmission of such association in the parameter set 36 for the picture 18 could be left off. However, the explicit assignment of segment index values to the segments 30 of picture 18 alleviates the mixing of tiles of two separate data streams.

The list TileSizeInCtbsY[k] for k ranging from 0 to ((num_tile_rows_minus1+1)*(num_tile_columns_minus1+1)−1), inclusive, specifying the size of the k-th tile within the picture in units of CTBs, is derived as follows (pseudo code 4):

```
for( j = 0, k = 0; j <= num_tile_rows_minus1 ; j++ )
  for( i = 0; i <= num_tile_columns_minus1 ; i++, k++ )
    TileSizeInCtbsY [ k ] = colWidth[ i ] * rowHeight[ j ]
```

TileSizeInCtbsY[i] is a vector containing entries 0 . . . N-1 with N being the number of segments 30, with the $i^{th}$ entry indicating the number of blocks 64 contained in the i$^{th}$ segment in raster scan segment order 116

The list TileSliceSegBaseAddr[k] for k ranging from 0 to ((num_tile_rows_minus1+1)*(num_tile_columns_minus1+1)−1), inclusive, specifying the slice segment address offset in tile scan of the first slice segment of the k-th tile within the picture in bitstream order in units of CTBs, is derived as follows (pseudo code 5):

```
TileSliceSegBaseAddr[ 0 ] = 0
  for( k = 1; k <= ( ( num_tile_rows_minus1 + 1 ) * (num_tile_columns_minus1 + 1) -
    1) ; k++ )
    TileSliceSegBaseAddr[ k ] = TileSliceSegBaseAddr[ k - 1 ] +
      TileSizeInCtbsY [ k - 1 ]
```

TileSliceSegBaseAddr[i] is a vector containing entries 0 . . . N−1 with N being the number of segments 30, with the i$^{th}$ entry indicating the address of the onset position 44 of the i$^{th}$ segment in raster scan segment order 116, measured as the number of blocks 64 along coding path from the picture onset position 24 to the segment onset position 44.

Here, "tile scan" denotes the scan 22 as depicted in FIG. 1. The TileSliceSegBaseAddr denotes the afore-mentioned base addresses of the onset positions 44 of the segments which, according to the present example, are equal to tiles. The computations denoted above may be used be decoders 38 and 52, respectively, to compute the base addresses. If a sub-picture decoding applies, the number of segments and their arrangement is to be adapted.

FIG. 6 illustrates as to how the slice segment headers, i.e. the afore-mentioned slice headers 34, could look like. In particular, here, the slice header 34 comprises a flag 120, namely first_slice_segment_in_area_flag which, together with a syntax element slice_segment_address 122 forms the start position information 42. Merely if flag 120 is not set, slice_segment_address is present and indicates the offset of the slice start position 40 from the onset position 44 of the corresponding segment/tile 30. The latter is indicated by the segment information 48 which comprises merely one syntax element 124, namely tile_id_in_sh which assumes values out of the domain of values defined in parameter set 70 of FIG. 4, namely by way of the syntax elements 114.

In particular, the semantics could be as indicated below:

first_slice_segment_in_area_flag equal to 1 specifies that, when slice_segment_base_addr_per_tile_enable_flag is equal to 0, the slice segment is the first slice segment of the picture in decoding order. Otherwise, when slice_segment_base_addr_per_tile_enable_flag is equal to 1, first_slice_segment_in_area_flag equal to 1 specifies that the slice segment is the first slice segment of a tile of the picture in decoding order. first_slice_segment_in_pic_flag equal to 0 specifies that the slice segment is not the first slice segment of the picture in decoding order or tile in decoding order respectively. Thus, slice_segment_base_addr_per_tile_enable_flag acts as an example for flag 60 discussed with respect to FIG. 2.

NOTE 1—This syntax element may be used for detection of the boundary between coded pictures that are consecutive in decoding order. However, when IDR pictures are consecutive in decoding order and have the same NAL unit type, loss of the first slice of an IDR picture can cause a problem with detection of the boundary between the coded pictures. This can occur, e.g., in the transmission of all-intra-coded video in an error-prone environment. This problem can be mitigated by alternately using the two different IDR NAL unit types (IDR_W_RADL and IDR_N_LP) for any two consecutive IDR pictures. The use of the temporal sub-layer zero index SEI message can also be helpful, as that SEI message includes the syntax element irap_pic_id, the value of which is different for IRAP pictures that are consecutive in decoding order. Some system environments have other provisions that can be helpful for picture boundary detection as well, such as the use of presentation timestamps in Rec. ITU-T H.222.0|ISO/IEC 13818-1 systems, access unit framing in the ISO/IEC 14496-12 ISO base media file format, or the marker bit in IETF RFC 3550 real-time transport protocol headers. dependent_slice_segment_flag equal to 1 specifies that the value of each slice segment header syntax element that is not present is inferred to be equal to the value of the corresponding slice segment header syntax element in the slice header. When not present, the value of dependent_slice_segment_flag is inferred to be equal to 0.

The variable SliceAddrRs is derived as follows:
  If dependent_slice_segment_flag is equal to 0, SliceAddrRs is set equal to CtbAddrInRs
  Otherwise, SliceAddrRs is set equal to SliceAddrRs of the preceding slice segment containing the coding tree block for which the coding tree block address is CtbAddrTsToRs[CtbAddrRsToTs[CtbAddrInRs]−1], where the variable CtbAddrInRs is specified in the semantics of slice_segment_address.

tile_id_in_sh specifies the index of the tile that the slice segment belongs to. The value of area_id_in_sh shall be in the range of 0 to 255. When area_id_in_sh is not present, it is inferred to be equal to 0. No more than one tile within a picture shall have the same value of tile_id_in_sh.

slice_segment_address specifies the address of the first coding tree block in the slice segment, in coding tree block raster scan of a picture (when slice_segment_base_addr_per_tile_enable_flag equal to 1) and tile scan of a picture otherwise as follows:

The variable maxNumCtbY is defined as (slice_segment_base_addr_per_tile_enable_flag ? TileSizeInCtbsY[tileIdx-TileIdMap[tile_id_in_sh]]: PicSizeInCtbsY); here, tileIdxTileIdMap[tile_id_in_sh] maps the tile_id_in_sh of a currently decoded/encoded slice, comprised by its segment information 48, onto the correct tileIdx, i.e. references the correct segment in picture 18 or 54, and TileSizeInCtbsY yields for this segment the maximum of the relative slice address, namely maxNumCtbsY−1, to be represented/representable by slice_segment_address of its start position information 42. The decoder and encoder may use pseudo codes 1 to 4 to compute this information.

The length of the slice_segment_address syntax element is then Ceil(Log2(maxNumCtbsY)) bits. The value of slice_segment_address shall be in the range of 0 to maxNumCtbsY−1, inclusive. When slice_segment_base_addr_per_tile_enable_flag is equal to 0, the value of slice_segment_address shall not be equal to the value of slice_segment_address of any other coded slice segment NAL unit of the same coded picture. When slice_segment_base_addr_per_tile_enable_flag is equal to 1, the value of slice_segment_address shall not be equal to the value of slice_segment_address of any other coded slice segment NAL unit belonging to the same tile within the same coded picture. When slice_segment_address is not present, it is inferred to be equal to 0.

The variable CtbAddrInRs, specifying a coding tree block address in coding tree block raster scan of a picture, is set equal to CtbAddrTsToRs[slice_segment_address+(slice_segment_base_addr_per_tile_enable_flag ? TileSliceSegBaseAddr[tileidxTileIdMap[tile_id_in_sh]]: 0)]. The variable CtbAddrInTs, specifying a coding tree block address in tile scan, is set equal to CtbAddrRsToTs[CtbAddrInRs]. The variable CuQpDeltaVal, specifying the difference between a luma quantization parameter for the coding unit containing cu_qp_delta_abs and its prediction, is set equal to 0. The variables CuQpOffsetCb and CuQpOffsetCr, specifying values to be used when determining the respective values of the Qp'Cb and Qp'Cr quantization parameters for the coding unit containing cu_chroma_qp_offset_flag, are both set equal to 0. Thus, in case of relative indication mode 46, tileIdxTileIdMap[tile_id_in_sh] maps the tile_id_in_sh of a currently decoded/encoded slice, comprised by its segment information 48, onto the correct tileIdx, i.e. references the correct segment in picture 18 or 54, and TileSliceSegBaseAddr yields for this segment the base address which is then to be added to the relative slice address, slice_segment_address, of its start position information 42 to yield to address of this slice. CtbAddrTsToRs merely translates the address measured along coding path 22 into the an address measured along a raster scan block order among blocks 64. The decoder and encoder may use pseude codes 5 to compute the base addresses of the segment onset positions 44, or, in case of explicit information exemplified hereinafter, merely the encoder.

As to the order of VCL NAL units and their association to coded pictures the following may be said.

In particular, the following specifies the order of VCL NAL units and their association to coded pictures.

Each VCL NAL unit is part of a coded picture.

The order of the VCL NAL units within a coded picture is constrained as follows:

The first VCL NAL unit of the coded picture shall have first_slice_segment_in_pic_flag equal to 1.

Let sliceSegAddrA and sliceSegAddrB be the values of CtbAddrTsToRs[slice_segment_address (slice_segment_base_addr_per_tile_enable_flag ? TileSliceSegBaseAddr[tileidxTileIdMap[tile_id_in_sh]: 0)]] of any two coded slice segment NAL units A and B within the same coded picture. When either of the following conditions is true, coded slice segment NAL unit A shall precede the coded slice segment NAL unit B:

TileId[CtbAddrRsToTs[sliceSegAddrA]] is less than TileId[CtbAddrRsToTs[sliceSegAddrB]].

TileId[CtbAddrRsToTs[sliceSegAddrA]] is equal to TileId[CtbAddrRsToTs[sliceSegAddrB]] and CtbAddrRsToTs[sliceSegAddrA] is less than CtbAddrRsToTs[sliceSegAddrB].

Decoders 38 and 52 may surveil these conditions in order to determine when a new access unit 36 starts in the inbound data stream 10 or 12, or to determine that any NAL unit is missing.

The variant A described so far may be varied in different terms to allow for an easier implementation and processing, for instance.

For instance, in the variant A, as already described above with respect to FIG. 1, segments 30 need not to be exactly tiles. To this, the slice segment base address calculation needs not to happen exclusively on tile granularity, but multiple tiles can be joined into an area then forming a segment 30 in accordance with the description brought forward above for which, then the slice segment base address may jointly be defined, i.e. slice addresses in slice headers are given relatively to the first CTU in bit stream order that belongs to a given area of multiple tiles, forming a segment 30.

Further, additionally or alternatively, in accordance with the variant B described in the following, it becomes clear that instead of burdening the client side or decoder with calculation of slice segment base addresses for each segment 30, an explicit signaling of slice segment base addresses may be provided in the datastream.

And even additionally or alternatively, the burden of repeating the tile structure signaling within each PPS of the video bit stream while guaranteeing, for instance, that tile_fixed_structure is equal to 1 when slice_segment_base_address_per_tile_enable_flag is equal to 1, may be reduced by allowing the tiling syntax to be carried either in SPS or PPS, wherein the PPS instance of the tiling syntax may override the tiling syntax setting carried within the SPS.

The following figures show by way of highlighting changes relative to the variant A described above. For instance, FIG. 7 shows a tiling syntax portion which may be used either in the PPS or SPS, wherein, when the tiling syntax of FIG. 7 is conveyed in a PPS, it overrules the tiling syntax provided by a corresponding SPS, i.e. it has higher precedents. FIG. 7, illustrates the possibility that the parameter set 36 of FIG. 1 carries bases addresses for the segment onset positions 44 by way of a base address data field 130.

The semantics could be as follows.

slice_segment_base_addr_per_area_enable_flag equal to 0 specifies that the variable CtbAddrInRs of a slice segment is derived solely from slice_segment_address. slice_segment_base_addr_per_area_enable_flag equal to 1 specifies that deriviation of CtbAddrInRs is based on slice_segment_address and a tile dependent offset. When slice_segment_base_addr_per_area_enable_flag is not present, it is inferred to be equal to 0.

area_id_in_ps[i] specifies the id of tiles in bitstream order. The value of area_id_in_ps[i] shall be in the range of 0 to 255 and area_id_in_ps[i] shall not have the same value as area_id_in_ps[j] for i unequal to j. When area_id_in_sh is not present, it is inferred to be equal to 0 slice_segment_base_address[i] specifies that base slice segment address in tile scan order for all slice segments belonging to the area with the same value of area_id_in_ps [i]. When not present, the value of slice_segment_base_address[i] is inferred to be equal to 0.

It is a requirement of bitstream conformance that when area_id_enable_flag is equal to 1, access unit delimiter NAL units are present in the bitstream.

It is a requirement of bitstream conformance that for no two values of i, where area_id_in_ps[i] have equal value, the value of slice_segment_base_address[i-1] are not equal.

FIGS. 8 and 9 provide an example for SPS and PPS syntax with an individual enable flags for tiling syntax signaling. Here, the following semantics are used.

tiles_enabled_in_sps_flag equal to 1 specifies that the SPS carries the default tiling syntax describing the default structure of the CVS.

tiles_enabled_in_pps_flag equal to 1 specifies that the PPS carries tiling syntax describing the actual tiling structure of the pictures of the CVS that are referring to the PPS and overwriting the tiling syntax within the referred SPS.

The coding tree block raster and tiling scanning conversion process would then look as follows.

The list colWidth[i] for i ranging from 0 to num_tile_columns_minus1, inclusive, specifying the width of the i-th tile column in units of coding tree blocks (CTBs), is derived as follows (pseudo code 1'):

```
if( uniform_spacing_flag )
    for( i = 0; i <= num_tile_columns_minus1; i++ )
        colWidth[ i ] = ( ( i + 1) * PicWidthInCtbsY ) / ( num_tile_columns_minus1 +
        1) - ( i * PicWidthInCtbsY ) / ( num_tile_columns_minus1 + 1)
else {
    colWidth[ num_tile_columns_minus1 ] = PicWidthInCtbsY (6 3)
    for( i = 0; i < num_tile_columns_minus1; i++ ) {
        colWidth[ i ] = column_width_minus1[ i ] + 1
        colWidth[ num_tile_columns_minus1 ] -= colWidth[ i ]
    }
}
```

The list rowHeight[j] for j ranging from 0 to num_tile_rows_minus1, inclusive, specifying the height of the j-th tile row in units of CTBs, is derived as follows (pseudo code 2'):

```
if( uniform_spacing_flag )
    for( j = 0; j <= num_tile_rows_minus1; j++ )
        rowHeight[ j ]=( ( j + 1) * PicHeightInCtbsY ) / ( num_tile_rows_minus1 + 1)
                      - ( j * PicHeightInCtbsY ) / ( num_tile_rows_minus1 + 1)
else {
    rowHeight[ num_tile_rows_minus1 ] = PicHeightInCtbsY (6 4)
    for( j = 0; j < num_tile_rows_minus1; j++ ) {
        rowHeight[ j ] = row_height_minus1[ j ] + 1
        rowHeight[ num_tile_rows_minus1 ] -= rowHeight[ j ]
    }
}
```

The list TileId[ctbAddrTs] for ctbAddrTs ranging from 0 to PicSizeInCtbsY−1, inclusive, specifying the conversion from a CTB address in tile scan to a tile ID, is derived as follows (pseudo code 3'):

```
for( j = 0, tileIdx = 0; j <= num_tile_rows_minus1; j++)
    for( i = 0; i <= num_tile_columns_minus1; i++ , tileIdx++ )
        for( y = rowBd[ j ]; y < rowBd[ j + 1 ]; y++ )
            for( x = colBd[ i ]; x < colBd[ i + 1 ]; x++ )
                TileId[ CtbAddrRsToTs[ y * PicWidthInCtbsY+ x ] ] = tileIdx
```

The variables remain their meaning as taught above, with N denoting, however, the number of tiles which may, however, due to collection of tiles to segments 30, be greater than the number M of segments 30.

The list TileSizeInCtbsY[k] for k ranging from 0 to ((num_tile_rows_minus1+1)*num_tile_columns_minus1+1)−1), inclusive, specifying the size of the k-th tile within the picture in units of CTBs, is derived as follows (pseudo code 4'):

```
for( areaId = 0; areaId <= 255; areaId ++ )
    AreaSizeInCtbsY [ areaId ] = 0
    for( j = 0, k = 0; j <= num_tile_rows_minus1 ; j++ )
```

-continued

```
        for( i = 0; i <= num_tile_columns_minus1 ; i++, k++ )
            if ( area_id_in_ps[ j * ( num_tile_columns_minus1 + 1) + i ] ==
            areaId )
                AreaSizeInCtbsY [ areaId ] += (colWidth[ i ] * rowHeight[ j ])
``` area_id_in_ps[ ] is a vector containing entries 0 ... N−1 with N being the number of tiles, with the $i^{th}$ entry indicating the segment index value associated with the segment which the $i^{th}$ tile in tile raster scan segment order is located in; the values entered in the entries assume values between 0 . . . 256 or, differently speaking, in the domain of possible values for the segment index in the segment information 48; remember the dependency on the picture decoding option/target, i.e. whether the base addresses of segments within picture 18 or sub-picture 54 are to be computed, so that N is the number of tiles in picture 18 or sub-picture 54, respectively AreaSizeInCtbsY[ ] is construed to become a vector containing an entry for each member of the domain of possible values for the segment index in the segment information 48, with indicating for each segment index value occurring in picture 18 or sub-picture 54, whatever is the current decoding target/option, the number of blocks 64 covered thereby A mapping from AreaId to AreaIdx is derived as follows:

```
NumTilesInArea[0...255]=0;
NumAreas = 1
    for( k = 0; k <= ( ( num_tile_rows_minus1 + 1 ) * (num_tile_columns_minus1 + 1) −
    1) ; k++ )
        NumTilesInArea[ area_id_in_ps[ k ] ]+=1
        If( NumTilesInArea[ area_id_in_ps[ k ] ]==1 )
            AreaIdToAreaIdx[area_id_in_ps[ k ]]= NumAreas++;
```

NumTilesInArea[ ] is construed to become a vector containing an entry for each member of the domain of possible values for the segment index in the segment information 48, with indicating for each segment index value occurring in picture 18 or sub-picture 54, whatever is the current decoding target/option, the number of tiles covered by the respective segment having this segment index value AreaIdToAreaIdx[ ] is construed to become a vector containing an entry for each member of the domain of possible values for the segment index in the segment information 48, with indicating for each segment index value occurring in picture 18 or sub-picutre 54, whatever is the current decoding target/option, its rank or index when assigned or measured along a raster scan segment order leading segment-row-wise from top left to bottom right The list AreaSliceSegBaseAddr[k] for k ranging from 0 to (NumAreas−1), inclusive, specifying the slice segment address offset of the first slice segment of the k-th area within the picture in bitstream order in units of CTBs, is derived as follows (pseudo code 5'):

In case of not using the explicit base address signalization, but using an implicit derivation of the base addresses instead, same may be performed by decoder or encoder as follows. The following computation is used be the encoder for the computation of the base addresses even in case of explicit base address signalization.

The list TileSliceSegBaseAddr[k] for k ranging from 0 to ((num_tile_rows_minus1+1)*(num_tile_columns_minus1+1)−1), inclusive, specifying the slice segment address offset of the first slice segment of the k-th tile within the picture in bitstream order in units of CTBs, and the list AreaSliceSegBaseAddr[k] for k ranging from 0 to (NumAreas−1), inclusive, specifying the slice segment address offset of the first slice segment of the k-th area within the picture in bitstream order in units of CTBs, is derived as follows (pseudo code 5"):

```
TileSliceSegBaseAddr [ 0 ]=0
AreaSliceSegBaseAddr[area_id_in_ps[ 0 ]]=0
NumTilesInArea[0...255]=0;
NumTilesInArea[ area_id_in_ps[ 0 ] ]=1
AreaIdToAreaIdx[area_id_in_ps[ 0 ] ] = 0
NumAreas = 1
    for( k =1; k <= ( ( num_tile_rows_minus1 + 1 ) * (num_tile_columns_minus1 + 1) −
    1) ; k++ )
        NumTilesInArea[ area_id_in_ps[ k ] ]+=1
            TileSliceSegBaseAddr[ k ] = TileSliceSegBaseAddr[ k − 1 ] +
            TileSizeInCtbsY [ k − 1 ]
        If(NumTilesInArea[area_id_in_ps[ k ] ]==1)
            AreaSliceSegBaseAddr[NumAreas]=TileSliceSegBaseAddr[ k ]
            AreaIdToAreaIdx[area_id_in_ps[ k ]]= NumAreas;
            NumAreas++;
```

```
AreaSliceSegBaseAddr [ 0 ] = 0
for( k = 1 ;k < ( NumAreas ) ; k++ )
AreaSliceSegBaseAddr [ k ] =
                    slice_segment_base_address[ k − 1 ]
```

AreaSliceSegBaseAddr[i] is construed to become a vector containing entries 0 . . . M−1 with M being the number of segments 30, being equal to NumAreas, and indicating at the $i^{th}$ entry the base address, i.e.

the segment onset position 44, for the $i^{th}$ segment in the afore-mentioned raster scan segment order, i.e. using AreaIdx which may be associated with area_id_in_sh of the slice's segment information 48 by decoder and encoder using AreaIdToAreaIdx.

Note that, thus, the base address data field 130 which is defined by the syntax elements slice_segment_base_address, defines, for each segment 30, the base address of the onset position 44 of the respective segment which addresses the onset position 44 relative to the picture onset position 24, although the explicit transmission of a base address for the first segment 30 of the picture 18 or sub-picture 54, in case of applying the explicit transmission to sub-picture decoding option(s), too, in raster scan segment order is omitted, as same is zero anyway. The definition that this base address is zero by way of the base address data field is a result of the convention that the explicit base address transmission starts with the second segment in raster scan segment order. Naturally, an alternative embodiment could be assessed where explicit base address transmission is used for all segments instead.

And additionally, FIG. 10 shows as to how the slice header could look like according to variant B with the following showing a possible semantics.

first_slice_segment_in_area_flag equal to 1 specifies that, when tiles_enabled_flag is equal to 0, the slice segment is the first slice segment of the picture in decoding order. Otherwise, when tiles_enabled_flag is equal to 1, first_slice_segment_in_pic_flag equal to 1 specifies that the slice segment is the first slice segment of a tile of the picture in decoding order. first_slice_segment_in_pic_flag equal to 0 specifies that the slice segment is not the first slice segment of the picture in decoding order.

NOTE 1—This syntax element may be used for detection of the boundary between coded pictures that are consecutive in decoding order. However, when IDR pictures are consecutive in decoding order and have the same NAL unit type, loss of the first slice of an IDR picture can cause a problem with detection of the boundary between the coded pictures. This can occur, e.g., in the transmission of all-intra-coded video in an error-prone environment. This problem can be mitigated by alternately using the two different IDR NAL unit types (IDR_W_RADL and IDR_N_LP) for any two consecutive IDR pictures. The use of the temporal sub-layer zero index SEI message can also be helpful, as that SEI message includes the syntax element irap_pic_id, the value of which is different for IRAP pictures that are consecutive in decoding order. Some system environments have other provisions that can be helpful for picture boundary detection as well, such as the use of presentation timestamps in Rec. ITU-T H.222.0|ISO/IEC 13818-1 systems, access unit framing in the ISO/IEC 14496-12 ISO base media file format, or the marker bit in IETF RFC 3550 real-time transport protocol headers.

dependent_slice_segment_flag equal to 1 specifies that the value of each slice segment header syntax element that is not present is inferred to be equal to the value of the corresponding slice segment header syntax element in the slice header. When not present, the value of dependent_slice_segment_flag is inferred to be equal to 0.

The variable SliceAddrRs is derived as follows:
  If dependent_slice_segment_flag is equal to 0, SliceAddrRs is set equal to CtbAddrInRs
  Otherwise, SliceAddrRs is set equal to SliceAddrRs of the preceding slice segment containing the coding tree block for which the coding tree block address is CtbAddrTsToRs[CtbAddrRsToTs[CtbAddrInRs]−1], where the variable CtbAddrInRs is specified in the semantics of slice_segment_address.

area_id_in_sh specifies the index of the tile that the slice segment belongs to. The value of area_id_in_sh shall be in the range of 0 to 255. When area_id_in_sh is not present, it is inferred to be equal to 0.

slice_segment_address specifies the address of the first coding tree block in the slice segment, in coding tree block raster scan of a picture (when slice_segment_base_addr_per_tile_enable_flag equal to 1) and tile scan of a picture otherwise as follows:
  The variable maxNumCtbY is defined as (slice_segment_addr_offset_per_tile_enable_flag ? AreaSizeInCtbsY[area_id_in_sh]: PicSizeInCtbsY)
  The length of the slice_segment_address syntax element is Ceil(Log2(maxNumCtbsY)) bits. The value of slice_segment_address shall be in the range of 0 to maxNumCtbsY−1, inclusive. When slice_segment_addr_offset_per_tile_enable_flag is equal to 0, the value of slice_segment_address shall not be equal to the value of slice_segment_address of any other coded slice segment NAL unit of the same coded picture. When slice_segment_addr_offset_per_tile_enable_flag is equal to 1, the value of slice_segment_address shall not be equal to the value of slice_segment_address of any other coded slice segment NAL unit of the same area within the same coded picture. When slice_segment_address is not present, it is inferred to be equal to 0.
  The variable CtbAddrInRs, specifying a coding tree block address in coding tree block raster scan of a picture, is set equal to CtbAddrTsToRs[slice_segment_address+(slice_segment_addr_offset_per_tile_enable_flag ? TileSliceSegBaseAddr[AreaIdToAreaIdx[area_id_in_sh]]: 0)]. The variable CtbAddrInTs, specifying a coding tree block address in tile scan, is set equal to CtbAddrRsToTs[CtbAddrInRs]. The variable CuQpDeltaVal, specifying the difference between a luma quantization parameter for the coding unit containing cu_qp_delta_abs and its prediction, is set equal to 0. The variables CuQpOffsetCb and CuQpOffsetCr, specifying values to be used when determining the respective values of the Qp′Cb and Qp′Cr quantization parameters for the coding unit containing cu_chroma_qp_offset_flag, are both set equal to 0.

As t the order of VCL NAL units and their association to coded pictures and access units 36, the following may be said:
  Each VCL NAL unit is part of a coded picture.
  The order of the VCL NAL units within a coded picture is constrained as follows:
    The first VCL NAL unit of the coded picture shall have first_slice_segment_in_pic_flag equal to 1.
    Let sliceSegAddrA and sliceSegAddrB be the values of CtbAddrTsToRs[slice_segment_address+CtbAddrRsToTs[(slice_segment_base_addr_per_tile_enable_flag ? AreaSliceSegBaseAddr[AreaIdToAreaIdx[area_id_in_sh]]: 0)]] of any two coded slice segment NAL units A and B within the same coded picture. When either of the following conditions is true, coded slice segment NAL unit A shall precede the coded slice segment NAL unit B:
      TileId[CtbAddrRsToTs[sliceSegAddrA]] is less than TileId[CtbAddrRsToTs[sliceSegAddrB]].
      TileId[CtbAddrRsToTs[sliceSegAddrA]] is equal to TileId[CtbAddrRsToTs[sliceSegAddrB]] and CtbAddrRsToTs[sliceSegAddrA] is less than CtbAddrRsToTs[sliceSegAddrB].

The description of a possible HEVC codec extension towards efficient sub-picture extraction presented above is preliminarily extended with respect to the aspect already announced with respect to FIG. 1 according to which the sub-picture extraction process is not only alleviated due to advantageous relative indication of the slices' starting position with respect to the current segments' onset positions, but additionally by providing a parameter set in the datastream which does not only provide information with respect to the decoding of the whole picture/video, but also with respect to the decoding of the sub-picture decoding option or, alternatively, several sub-picture decoding options so that the extraction process may, in fact, merely be restricted to actions concerning the omission or discarding of slices not needed according to the sub-picture decoding option of interest. In even other words, according to this extension of the above-described HEVC modification, the interest in decoding merely a sub-picture, i.e. the selection of a sub-picture decoding option, is treated like the omission of layers of a multi-layer datastream with choosing all corresponding layers corresponding to a decoding of the complete picture area of the original datastream. Later on, it will be noted that the latter aspect may also be used independent from the relative slice starting point indication discussed above.

Thus, the extension described now allows for an easier extraction process without parameter set rewriting. Like in extraction processes of layered bit streams, removal of NAL unit carrying slice data and parameter sets is sufficient to create a conforming bit stream and a decoder receiving the bit stream could easily determine the actual operation point represented in the extracted bit stream. The operation point in this context exists within a space spent, at least, by the subset of the segment grid or tiling grid in case of using tiles as segments, and, optionally, further scalability dimensions such as spatial resolution, temporal resolution, SNR scalability and so forth.

According to the current embodiment, parameter sets, such as VPS or SPS, define several operation points in tiling context, in the following referred to as output tile set (OTS), for which several characteristics are described. A specific embodiment is depicted in FIG. 11, here exemplarily assuming that the parameters concerning OTS are contained in the SPS.

As depicted in FIG. 11, the parameter set, here exemplarily the SPS, indicates how the decoding of the complete pictures 18 (compared FIG. 1) a tiling syntax 140 an example of which has been presented in FIG. 7 exemplarily and which indicates the subdivision of picture 18 into segments and, optionally, the association of segment index values to these segments and, optionally, the base addresses of the onset positions of these segments, respectively, as well as the size of picture 18, namely the horizontal size at 142 and the vertical size at 144 as well as the decoder capability level for decoding picture 18 at 146 for i=0, for instance. With num_output_tile_format being greater than 1, which syntax element is transmitted at 148, the parameter set of FIG. 11 additionally signals the information 142 to 146 for further sub-picture decoding options indicating other picture sizes and associated decoder capability levels for pictures 54. According to the example of FIG. 11, various compositions of segments 30, here exemplarily tiles, to result into corresponding picture sizes as indicated by 142 and 144 for the output formats is signaled, too, separately. Num_output_tile_sets is in syntax elements which is transmitted at 150 and indicates the number of search compositions. Each composition is associated with one of the output tile formats by an index 152. The number of tiles which compose the respective picture 18 or picture 54 is transmitted at 154 and the segment indices are transmitted for the individual tile compositions at 156. Finally, for each tile composition of the number indicated by 150, the parameter set indicates at 158 additional information for decoding, namely parameters related to decoding time stamps and/or coded picture buffer with travel times and/or buffer sizes needed for decoding the respective segment composition (or tile composition) from the datastream.

When using the embodiment of FIG. 11, the decoding process which takes place in decoder 38 or 52, takes an additional input parameter which may refer to as Target Output Tile Set, that indicates which of the defined OTS is selected for decoding, wherein this input parameter represents the signal 58 discussed above with respect to FIG. 1.

The parameter TargetOutputTileSet can determine by various means:
- external means such as an indication by a system layer through signaling in File Format, Transport Stream, SDP or others.
- the presence of an SEI message in the bitstream indicating which tiles or OTSs are present within the bitstream, i.e. a description of former extraction processes the bitstream underwent. Thus, extraction information may be contained in the data stream which indicates one or more decodable OTS.
- parsing the values of syntax elements tile_id_sh in slice headers of NAL units within an access unit to determine which of the defined OTS can be decoder with contents of the bitstream.

A priority can be assigned to the defined OTSs to help determine the OTSs to be decoded, e.g. through:
- explicit signalling in the loop over num_output_tile_sets or SEI messages assigning a priority to the OTSs per order in the loop over num_output_tile_sets
- present tiles/removed tiles SEI message with indication of all contained OTS in bitstream Thus, the parameter set 36 may contain, for each decoding option as signalled by 148, and for each segment collection as defined by 150 and 158 for that decoding option, a priority indication indicating a priority at which this segment collection which defines a specific sub-picture composition, is to be chosen for the decoding target by decoder 38 and 52, respectively. The priority indication may indicate the priorities among all of the segment collection options the number of which his signalled by 150 globally, or merely individually among the groups belonging to one common sub-picture option, i.e. same sub-picture size and corresponding decoder capability level.

The TileSliceSegBaseAddr derivation needs to be adjusted (highlighted in turquoise) with respect to Variant A as follows:

The list TileId[ctbAddrTs] for ctbAddrTs ranging from 0 to PicSizeInCtbsY−1, inclusive, specifying the conversion from a CTB address in tile scan to a tile ID, is derived as follows:

```
for( j = 0, tileIdx = 0; j <= num_tile_rows_minus1; j++ )
  for( i = 0; i <= num_tile_columns_minus1; i++, tileIdx++ )
    tileIdxTileIdMap[ tile_id_in_pps[ tileIdx ] ] = tileIdx
    for( y = rowBd[ j ]; y < rowBd[ j + 1 ]; y++ ) (6 9)
      for( x = colBd[ i ]; x < colBd[ i + 1 ]; x++ )
        TileId[ CtbAddrRsToTs[ y * PicWidthInCtbsY+ x ] ] = tileIdx
```

The list TileSizeInCtbsY[k] for k ranging from 0 to ((num_tile_rows_minus1+1)*(num_tile_columns_minus1+1)−1), inclusive, specifying the size of the k-th tile within the picture in units of CTBs, is derived as follows:

```
for( j = 0, k = 0; j <= num_tile_rows_minus1 ; j++ )
  for( i = 0; i <= num_tile_columns_minus1 ; i++, k++ )
    TileSizeInCtbsY [ k ] = colWidth[ i ] * rowHeight[ j ]
```

For the i-th target OTS, the list TileSliceSegBaseAddr[k] for k ranging from 0 to ((num_tile_rows_minus1+1)*(num_tile_columns_minus1+1)−1), inclusive, specifying the slice segment address offset in tile scan of the first slice segment of the k-th tile within the picture in bitstream order in units of CTBs, is derived as follows:

```
TileSliceSegBaseAddr[ 0 ] = 0
cnt=1
  for( k = 1; k <= ( ( num_tile_rows_minus1 + 1 ) * (num_tile_columns_minus1 + 1) − 1) ; k++ )
  if ( tileIdxInTargetOTS) {
    TileSliceSegBaseAddr[ cnt ] = TileSliceSegBaseAddr[ cnt − 1 ] +
                TileSizeInCtbsY [ k − 1 ]
    cnt++
    // with cnt derivable from tile_id_in_sh with a mapping table to
    tile_id_in_sps
  }
```

Wherein tileIdxInTargetOTS is true for all tiles that belong to the TargetOutputTileSet and false otherwise. It is noted that with the above, the tile arrangement within the decoded picture of the TargetOutputTileSet remains similar to tile arrangement in the original bitstream. Raster to tile scan conversion and vice versa is done considering the tiles within the targetOutputTileSet only.

As already denoted above, the extension just described with respect to FIG. 11, which concerns the parameter set 36 and its signaling of picture size and corresponding decoder capability level not only for original picture 18, but also for sub-picture 54, may be use in a frame work where the afore-mentioned slices' start position information 42 is not present, for instance. For example, by convention, slices can be restricted to not start within a segment 30, but merely at segment onset positions. Then, the segment information 48 can suffice, for instance. Other examples can also be possible. In either case, the decoder 38 or 52 which receives stream 10 or 12 (with or without the start position information 42) uses the information in the parameter set 36 which equals 36' as follows. In particular, it decodes the parameter set 36 from the inbound data stream which can be 10 or 12 and derives the decoding option indication 58 whether a picture decoding or sub-picture decoding is to be performed on the inbound data stream. Picture decoding denotes the target of decoding picture 18 from data stream 10, i.e. the composition of picture 10 out of all segments 30. Hence, all slices 26 need to be in the data stream 10 to achieve this aim. A sub-picture decoding aim is the target of decoding a picture 54 from data stream 12. "A picture 54" means that more than one sub-picture decoding option may be signaled in parameter set 36 with same differing in picture size and shape and decoder capability level. For instance, in the example of FIG. 1, different sub-picture decoding options may result from forming composing a sub-picture 54 from two segments 30 side by side, composing a sub-picture 54 from two segments 30 one upon the other or composing a sub-picture 54 from one segment 30 only, with these examples being extendible by composing a sub-picture out of three segments 30, for example.

If the picture decoding is to be performed on the data stream, the decoder derives from the parameter set 36 a size of the picture 18 such as via 142 and 144 for i=0 and an indication of the decoder capability level that may be used for decoding the picture 18 such as via 146 for i=0 from the data stream, and it derives from the parameter set 36 an information on the subdivision of the picture 18 into a first set of segments 30, namely all segments, which are encoded into the data streams without coding interdependencies, such as from tiling syntax 140. Further, it decodes the picture 18 from the data stream in units of slices 26 into which the picture 18 is partitioned along coding path 22. As to the placement of decoded picture content of the individual slices 26 in case of same comprising start position information, see the above description. It can be that the decoder checks the decoder capability level whether same is met by the decoder 38.

In case of the decoding option indication 58 suggesting that a sub-picture decoding is to be performed on the inbound data stream, however, the decoder derives from the parameter set 36 a further picture size of sub-picture 54 and an indication of a decoder capability level that may be used for decoding the sub-picture 54 from the data stream such as via 142, 144 and 146 for i≠0, derives from the parameter set 36 an information on the subdivision of the sub-picture 54 into a second set of segments which segments are encoded into the data streams without coding interdependencies and which second set is a subset of the set of segments of picture 18, and decodes the sub-picture 54 from the data stream in units of those slices 26 into which the sub-picture 54 encoded. Even here the decoder uses or obeys a coding path 22'. This time it traverses the other target aim, namely sub-picture 54. Like coding path 22 traversing picture 18, coding path 22' sequentially, segment by segment, traverses the sub-picture 54 and each slice 26 among those pertaining any fraction of sub-picture 54, has a fraction of a segment, or one or more segments completely, out of the second set of segments encoded thereinto, which form the composition of sub-picture 54. Note that coding path or order 22' can traverse the subset of segments 30 participating in composing sub-picture 54 in an order different from the order same are traversed by coding path 22 within original picture 18. This does, however, not influence the decoding result as the segment coding independency prohibits coding dependencies across segment boundaries anyway. Within each segment 30, however, paths 22 and 22' coincide, and that is important to keep decoding synchrony and even the placement of slices' content when using start position information 42 is not influenced. Again, decoder may check the decoder capability level for the sub-picture decoding option whether same is met by the decoder 38/52.

As discussed above, the decoder may derive the decoding option indication 58 by different means. For example, the decoder 52 may analyze the segments covered by the slices present in the inbound data stream, i.e. 10 or 12, to determine whether and if yes as to which slices and correspond segments have been removed by omission by way of a network device 50, for instance. Further, additionally or alternatively, external signalization as depicted by 58 in FIG. 1 may be used by decoder 38 or 52 to determine the decoding option or target to be used. The external signalization may already uniquely identify the coding option to be used or may merely exclude some coding options not to be used, or not being available due to, for instance, an intermediate extraction process 14 in which case this external signalization may stem from the network device 50, or may identify positively a set of coding options out of which the decoder shall select one on the basis of further information. Further, additionally or alternatively, side information in the inbound data stream such as explicit information on the yet decodable options may be used by decoder 38 or 52 to determine the decoding option or target to be used. Like external information, the latter information can have been included by the extracting entity, i.e. device 50. Further, decoder may check the decoder capability levels associated with the decoding options as present in the parameter set 54, to exclude some of the list of possible decoding option candidates when they conflict with the decoder's capability. A combination of some or all of these hints may form the decoding option indication, too. In case of any remaining ambiguity, the decoder may use the afore-mentioned priority to determine one of remaining possible decoding option candidates with highest priority.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

The inventive data streams can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A method of encoding, the method comprising:
partitioning a picture into slices, wherein the picture is subdivided into segments that are traversed by a coding path sequentially, and wherein each of the slices have one or more of the segments completely encoded thereinto;
providing a slice header that contains a start position information corresponding to a respective slice of the slices, wherein the start position information indicates a starting position of the respective slice relative to an onset position from which the picture is encoded along the coding path; and
encoding the slice header and the respective slice into a data stream.

2. The method of claim 1, wherein the picture is encoded into the segments without coding interdependencies.

3. The method of claim 1, wherein the segments comprise tiles.

4. The method of claim 1, wherein the onset position is indicated by a parameter set.

5. An encoder comprising:
a processor that executes instructions to perform operations comprising:
partitioning a picture into slices, wherein the picture is subdivided into segments that are traversed by a coding path sequentially, and wherein each of the slices have one or more of the segments completely encoded thereinto;
providing a slice header that contains a start position information corresponding to a respective slice of the slices, wherein the start position information indicates a starting position of the respective slice relative to an onset position from which the picture is encoded along the coding path; and
encoding the slice header and the respective slice into a data stream.

6. The encoder of claim 5, wherein the picture is encoded into the segments without coding interdependencies.

7. The encoder of claim 5, wherein the segments comprise tiles.

8. The encoder of claim 5, wherein the onset position is indicated by a parameter set.

9. A method of decoding, the method comprising:
receiving, via a data stream, a picture that is partitioned into slices, wherein the picture is subdivided into segments that are traversed by a coding path sequentially, and wherein each of the slices have one or more of the segments completely encoded thereinto;

decoding, from the data stream, a slice header that contains a start position information corresponding to a respective slice of the slices; and locating, using the start position information, a starting position of the respective slice relative to an onset position from which the picture is encoded along the coding path.

10. The method of claim 9, wherein the picture is encoded into the segments without coding interdependencies.

11. The method of claim 9, wherein the segments comprise tiles.

12. The method of claim 9, wherein the onset position is indicated by a parameter set.

13. A decoder comprising:
a processor that executes instructions to perform operations comprising:
receiving, via a data stream, a picture that is partitioned into slices, wherein the picture is subdivided into segments that are traversed by a coding path sequentially, and wherein each of the slices have one or more of the segments completely encoded thereinto;
decoding, from the data stream, a slice header that contains a start position information corresponding to a respective slice of the slices; and
locating, using the start position information, a starting position of the respective slice relative to an onset position from which the picture is encoded along the coding path.

14. The decoder of claim 13, wherein the picture is encoded into the segments without coding interdependencies.

15. The decoder of claim 13, wherein the segments comprise tiles.

16. The decoder of claim 13, wherein the onset position is indicated by a parameter set.

17. A non-transitory computer-readable storage medium having stored thereon instructions executable by processing circuitry to perform operations comprising:
receiving, via a data stream, a picture that is partitioned into slices, wherein the picture is subdivided into segments that are traversed by a coding path sequentially, and wherein each of the slices have one or more of the segments completely encoded thereinto;
decoding, from the data stream, a slice header that contains a start position information corresponding to a respective slice of the slices; and
locating, using the start position information, a starting position of the respective slice relative to an onset position from which the picture is encoded along the coding path.

18. The non-transitory computer-readable storage medium of claim 17, wherein the picture is encoded into the segments without coding interdependencies.

19. The non-transitory computer-readable storage medium of claim 17, wherein the segments comprise tiles.

20. The non-transitory computer-readable storage medium of claim 17, wherein the onset position is indicated by a parameter set.

\* \* \* \* \*